United States Patent
Burshan et al.

(10) Patent No.: US 9,442,748 B2
(45) Date of Patent: Sep. 13, 2016

(54) MULTI-RPO DATA PROTECTION

(75) Inventors: Chen Burshan, Tel Aviv (IL); Omri Shefi, Qiryat Ono (IL); Yair Kuszpet, Netanya (IL)

(73) Assignee: ZERTO, LTD., Herzilya (IL)

( * ) Notice: Subject to any disclaimer, the term of this patent is extended or adjusted under 35 U.S.C. 154(b) by 139 days.

(21) Appl. No.: 13/367,448

(22) Filed: Feb. 7, 2012

(65) Prior Publication Data

US 2012/0137173 A1 May 31, 2012

Related U.S. Application Data

(63) Continuation-in-part of application No. 13/175,898, filed on Jul. 4, 2011, which is a continuation-in-part of application No. 13/039,446, filed on Mar. 3, 2011.

(60) Provisional application No. 61/314,589, filed on Mar. 17, 2010.

(51) Int. Cl.
*G06F 11/14* (2006.01)
*G06F 9/455* (2006.01)
*G06F 11/20* (2006.01)

(52) U.S. Cl.
CPC ....... *G06F 9/45533* (2013.01); *G06F 11/2066* (2013.01); *G06F 11/2082* (2013.01); *G06F 11/2097* (2013.01); *G06F 11/1471* (2013.01); *G06F 11/1484* (2013.01); *G06F 11/2038* (2013.01); *G06F 11/2048* (2013.01); *G06F 11/2069* (2013.01); *G06F 11/2071* (2013.01); *G06F 2009/45579* (2013.01); *G06F 2201/815* (2013.01); *G06F 2201/855* (2013.01)

(58) Field of Classification Search
CPC ....................................................... G06F 11/14
USPC ............................................ 709/223; 714/15
See application file for complete search history.

(56) References Cited

U.S. PATENT DOCUMENTS

| 5,212,784 A | 5/1993 | Sparks |
| 5,544,347 A | 8/1996 | Yanai et al. |
| 5,649,152 A | 7/1997 | Ohran et al. |
| 5,664,186 A | 9/1997 | Bennett et al. |
| 5,835,953 A | 11/1998 | Ohran |
| 5,933,653 A | 8/1999 | Ofek |
| 5,935,260 A | 8/1999 | Ofer |
| 5,991,813 A | 11/1999 | Zarrow |

(Continued)

FOREIGN PATENT DOCUMENTS

WO 2009151445 A1 12/2009

OTHER PUBLICATIONS

Olzak, T., "Secure hypervisor-based vitual server environments", Feb. 26, 2007. http://www.techrepublic.com/blog/security/secure-hypervisor-based-virtual-server-environments/160.

(Continued)

*Primary Examiner* — Vivek Srivastava
*Assistant Examiner* — Sibte Bukhari
(74) *Attorney, Agent, or Firm* — Foley & Lardner LLP; James De Vellis

(57) ABSTRACT

A system for disaster recovery including a controller (i) for controlling bandwidth usage of a disaster recovery system in accordance with a plurality of recovery point objectives (RPOs), each RPO designating a maximal time loss constraint for data recovery for an enterprise production system, and a corresponding bandwidth allocation for the disaster recovery system to use in replicating data for the enterprise production system, wherein the RPOs are applied in accordance with a calendar-based schedule of dates and times, and (ii) for issuing an RPO alert when the RPO maximal time loss constraint for a current date and time is not satisfied.

20 Claims, 17 Drawing Sheets

(56) References Cited

U.S. PATENT DOCUMENTS

| | | | |
|---|---|---|---|
| 6,073,209 A | 6/2000 | Bergsten | |
| 6,073,222 A | 6/2000 | Ohran | |
| 6,658,591 B1 | 12/2003 | Arndt | |
| 6,910,160 B2 | 6/2005 | Bajoria et al. | |
| 6,944,847 B2 | 9/2005 | Desai et al. | |
| 7,063,395 B2 | 6/2006 | Gagne et al. | |
| 7,143,307 B1 | 11/2006 | Witte et al. | |
| 7,325,159 B2 | 1/2008 | Stager et al. | |
| 7,421,617 B2 | 9/2008 | Anderson et al. | |
| 7,464,126 B2 | 12/2008 | Chen | |
| 7,475,207 B2 | 1/2009 | Bromling et al. | |
| 7,516,287 B2 | 4/2009 | Ahal et al. | |
| 7,523,277 B1 | 4/2009 | Kekre et al. | |
| 7,557,867 B2 | 7/2009 | Goo | |
| 7,577,817 B2 | 8/2009 | Karpoff et al. | |
| 7,577,867 B2 | 8/2009 | Lewin et al. | |
| 7,603,395 B1 | 10/2009 | Bingham et al. | |
| 7,647,460 B1 | 1/2010 | Wilson et al. | |
| 7,720,817 B2 | 5/2010 | Stager et al. | |
| 7,765,433 B1 | 7/2010 | Krishnamurthy | |
| 7,791,091 B2 | 9/2010 | Nagai | |
| 7,849,361 B2 | 12/2010 | Ahal et al. | |
| 7,865,893 B1 | 1/2011 | Omelyanchuk et al. | |
| 7,971,091 B1 | 6/2011 | Bingham et al. | |
| 8,156,301 B1 | 4/2012 | Khandelwal et al. | |
| 8,352,941 B1 | 1/2013 | Protopopov et al. | |
| 8,650,299 B1 | 2/2014 | Huang et al. | |
| 2004/0068561 A1 | 4/2004 | Yamamoto et al. | |
| 2004/0153639 A1 | 8/2004 | Cherian et al. | |
| 2005/0071588 A1 | 3/2005 | Spear et al. | |
| 2005/0171979 A1 | 8/2005 | Stager et al. | |
| 2005/0182953 A1 | 8/2005 | Stager et al. | |
| 2005/0188256 A1 | 8/2005 | Stager et al. | |
| 2006/0047996 A1 | 3/2006 | Anderson et al. | |
| 2006/0112222 A1 | 5/2006 | Barrall | |
| 2006/0129562 A1* | 6/2006 | Pulamarasetti et al. | 707/10 |
| 2006/0161394 A1 | 7/2006 | Dulberg et al. | |
| 2007/0028244 A1 | 2/2007 | Landis et al. | |
| 2007/0162513 A1 | 7/2007 | Lewin et al. | |
| 2007/0220311 A1 | 9/2007 | Lewin et al. | |
| 2008/0086726 A1 | 4/2008 | Griffith et al. | |
| 2008/0177963 A1* | 7/2008 | Rogers | 711/162 |
| 2008/0195624 A1 | 8/2008 | Ponnappan et al. | |
| 2009/0187776 A1 | 7/2009 | Baba et al. | |
| 2009/0249330 A1 | 10/2009 | Abercrombie et al. | |
| 2009/0283851 A1* | 11/2009 | Chen | 257/475 |
| 2010/0017801 A1 | 1/2010 | Kundapur | |
| 2010/0027552 A1 | 2/2010 | Hill | |
| 2010/0150341 A1 | 6/2010 | Dodgson et al. | |
| 2010/0175064 A1 | 7/2010 | Brahmaroutu | |
| 2010/0198972 A1 | 8/2010 | Umbehocker | |
| 2010/0250824 A1 | 9/2010 | Belay | |
| 2010/0250892 A1 | 9/2010 | Logan et al. | |
| 2010/0274886 A1 | 10/2010 | Nahum et al. | |
| 2011/0022812 A1 | 1/2011 | van der Linden et al. | |
| 2011/0075674 A1 | 3/2011 | Li et al. | |
| 2011/0099200 A1 | 4/2011 | Blount et al. | |
| 2011/0099342 A1 | 4/2011 | Ozdemir | |
| 2011/0125980 A1 | 5/2011 | Brunet et al. | |
| 2011/0131183 A1 | 6/2011 | Chandhok et al. | |
| 2011/0153569 A1 | 6/2011 | Fachan et al. | |
| 2011/0161299 A1 | 6/2011 | Prahlad et al. | |
| 2011/0161301 A1 | 6/2011 | Pratt et al. | |
| 2011/0264786 A1 | 10/2011 | Kedem et al. | |
| 2012/0110086 A1 | 5/2012 | Baitinger et al. | |
| 2012/0110572 A1 | 5/2012 | Kodi et al. | |
| 2012/0185913 A1 | 7/2012 | Martinez et al. | |
| 2013/0014104 A1 | 1/2013 | Natanzon et al. | |

OTHER PUBLICATIONS

Non-Final Office Action dated Mar. 4, 2013 in U.S. Appl. No. 13/039,446, filed Mar. 3, 2011, 13 pages.
Non-Final Office Action dated Jun. 6, 2013 in U.S. Appl. No. 13/039,446, filed Mar. 3, 2011, 15 pages.
Non-Final Office Action dated Jun. 21, 2013 in U.S. Appl. No. 13/175,892, filed Jul. 4, 2011, 15 pages.
Office Action on U.S. Appl. No. 13/175,898 dated Dec. 18, 2015.
Notification Concerning Transmittal of International Preliminary Report on Patentability dated Jan. 7, 2014 in corresponding PCT Application No. PCT/IL2012/000271, 12 pages.
U.S. Final Office Action dated Dec. 30, 2013 in related U.S. Appl. No. 13/039,446, filed Mar. 3, 2011, 10 pages.
Amendment "B" and Response to Office Action from Prosecution History of U.S. Pat. No. 7,603,395, Apr. 9, 2009, (13 pages).
Amendment "E" and Response to Office Action from Prosecution History of U.S. Pat. No. 7,971,091., Nov. 19, 2010, (14 pages).
Amendment and Response to Office Action from Prosecution History of U.S. Pat. No. 7,647,460, Aug. 30, 1999(22 pages).
Answer Claim Construction Brief of Plaintiffs *EMC Corporation and EMC Israel Development Center, Ltd., EMC Corporation and EMC Israel Development Center, Ltd.*, v. *Zerto, Inc.*, Case No. 12-956(GMS), May 9, 2014, (24 pages).
Appellants' Brief Pursuant to 37 C.F.R section 1.192 from Prosecution History of U.S. Pat. No. 7,647,460., May 9, 2002, (34 pages).
Complaint, *EMC Corporation and EMC Israel Development Center, Ltd.*, v. *Zerto, Inc.*, Case No. Demand for Jury Trial, Jul. 20, 2012, (13 pages).
Defendant Zerto, Inc.'s Amended Answer to the First Amended Complaint, Affirmative Defense, and Counterclaims, *EMC Corporation and EMC Israel Development Center, Ltd.*, v. *Zerto, Inc.*, Case No. 12-956-GMS, Aug. 7, 2014, (34 pages).
Defendant Zerto, Inc.'s Claim Construction Answering Brief, *EMC Corporation and EMC Israel Development Center, Ltd.*, v. *Zerto, Inc.*, Case No. 12-956 (GMS), May 9, 2014, (23 pages).
Defendant Zerto, Inc.'s Opening Brief in Support of its Motion for Leave to Amend its Answer to the First Amended Complaint, Affirmative Defense and Counterclaims, *EMC Corporation and EMC Israel Development Center, Ltd.*, v. *Zerto, Inc.*, Case No. 12-956-GMS, Jun. 6, 2014, (24 pages).
Defendant Zerto, Inc.'s Opening Brief in Support of Its Motion for Leave to Amend Its Answer to the First Amended Complaint, Affirmative Defense and Counterclaims, *EMC Corporation and EMC Israel Development Center, Ltd.*, vs. *Zerto, Inc.*, Case No. 12-956(GMS) 24 pages, Jun. 6, 2014.
Defendant Zerto, Inc.'s Opening Claim Construction Brief., *EMC Corporation and EMC Israel Development Center, Ltd.*, v. *Zerto, Inc.*, Case No. 12-956(GMS), Apr. 11, 2014, (26 pages).
Defendant Zerto, Inc.'s Reply Brief in Support of its Motion for Leave to Amend its Answer to the First Amended Compliant, Affirmative Defense and Counterclaims, *EMC Corporation and EMC Israel Development Center, Ltd.*, v. *Zerto, Inc.*, Case No. 12-956-GMS, Jul. 9, 2014, (16 pages).
Defendant's Answering Brief in Opposition to Plaintiffs' Motion to Strike and Dismiss Defendant's Affirmative Defense and Counterclaims of "Invalidity" based on Assignor *Estoppel, EMC Corporation and EMC Israel Development Center, Ltd.*, v. *Zerto, Inc.*, Case No. 12-956(GMS), Nov. 5, 2012, (21 pages).
EMC Corporation and EMC Israel Development Center, Ltd.'s Answer to the Amended Counterclaims of Zerto Inc., *EMC Corporation and EMC Israel Development Center, Ltd.*, v. *Zerto, Inc.*, Case No. 12956-GMS, Aug. 25, 2014, (12 pages).
EMC's Answer Brief in Opposition to Zerto's Motion for Judgment on the Pleadings on Count III o fthe First Amended Complaint, *EMC Corporation and EMC Israel Development Center, Ltd.*, v. *Zerto, Inc.*, Case No. 12-956-GMS, Aug. 11, 2014, (25 pages).
EMC's Answering Brief in Opposition to Zerto's Motion for Leave to Amend its Answer to the First Amended Complaint by Adding an Inequitable Conduct Defense and Counterclaims, *EMC Corporation and EMC Israel Development Center, Ltd.*, v. *Zerto, Inc.*, Case No. 12-956-GMS, Jun. 23, 2014 (25 pages).
Joint Appendix of Intrinsic and Dictionary Evidence, *EMC Corporation and EMC Israel Development Center, Ltd.*, v. *Zerto, Inc.*, Case No. 12-956-GMS, May 12, 2014, (366 pages).
Joint Claim Construction Chart, *EMC Corporation and EMC Israel Development Center, Ltd.*, v. *Zerto, Inc.*, Case No. 12-956(GMS), Mar. 21, 2014, (24 pages).

(56) References Cited

OTHER PUBLICATIONS

Memorandum, *EMC Corporation and EMC Israel Development Center, Ltd.*, v. *Zerto, Inc.*, Case No. 12-956-GMS, Jul. 31, 2014 (8 pages).
Opening Brief in Support of Defendant Zerto, Inc.'s Motion for Judgment on the Pleadings on Count III of the First Amended Compliant, *EMC Corporation and EMC Israel Development Center, Ltd.*, v. *Zerto, Inc.*, Case No. 12-956-GMS, Jul. 25, 2014, (19 pages).
Order Construing the Terms of U.S. Pat. Nos. 7,647,460; 6,073,222; 7,603,395; 7,971,091; and 7,577,867, *EMC Corporation and EMC Israel Development Center, Ltd.*, v. *Zerto, Inc.*, Case No. 12956-GMS, Sep. 5, 2014, (0 pages).
Plaintiffs EMC Corporation and EMC Israel Development Center, Ltd.'s Opening Claim Construction Brief, *EMC Corporation and EMC Israel Development Center, Ltd.*,v. *Zerto, Inc.*, Case No. 12-956(GMS), Apr. 11, 2014, (26 pages).
Plaintiffs' Opening Brief in Support of their Motion to Strike and Dismiss Defendant's Affirmative Defense and Counterclaims of "Invalidity" Based on Assignor Estoppel, *EMC Corporation and EMC Israel Development Center, Ltd.*, v. *Zerto, Inc.*, Case No. 12-956(GMS), Oct. 4, 2012, (18 pages).
Revised Joint Claim Construction Chart, *EMC Corporation and EMC Israel Development Center, Ltd.*, v. *Zerto, Inc.*, Case No. 12-956(GMS), Apr. 11, 2014, (19 pages).
Revised Joint Claim Construction Chart, *EMC Corporation and EMC Israel Development Center, Ltd.*, v. *Zerto, Inc.*, Case No. 12-956(GMS), Jun. 6, 2014, (19 pages).
Transcript of Markman Hearing, *EMC Corporation and EMC Israel Development Center, Ltd.*, v. *Zerto, Inc.*, Case No. 12-956-GMS, Jun. 25, 2014 (94 pgs).
FreezeFrame User's Guide, Version 1.1, Document Version 1.1, 60 pgs, Nov. 1993.
Harper Collins, Collins English Dictionary, Third Edition Updated 1994, Section JA-258-260(3 pages).
Illuminata EMC RecoverPoint: Beyond Basics CDP Searched via internet on Nov. 10, 2013.
Mendocino: The RecoveryOne Solution, Architecture Guide, 22 pages Product Version 1.0, Jan. 3, 2006.
Merriam-Webster, Inc., Webster's Third New International Dictionary, Section JA-276-279 (4 pages) Copyright 2002.
Microsoft Press, Microsoft Computer Dictionary, Fifth Edition, Section JA-341-343, p. 296 (4 pages) 2002.
NetWorker PowerSnap Module for EMC Symmetrix, Release 2.1 Installation and Administrator's Guide, 238 pgs, printed Sep. 2005.
Reference Model for Open Storage Systems Interconnection, Mass Storage System Reference Model Version 5, Sep. 1994 (36 pages).
Storage Networking Industry Association Dictionary, http://web.archive.org/web20060220153102/http://www.snia.org/education/dictionary/a, pp. JA-261-273 (13 pages) 2006.
Tech Target Search.,http://searchstorage.techtarget.com/definition/storage-snapshot.html, (p. JA-274) Jul. 2005.
The Kashya KB 4000 Administrator's User Guide Product Release 2.0, 105 pgs, Aug. 2004.
The RecoveryONE Solution, Architecture Guide, Product Version 1.0, 22 pgs, Jan. 2006.
Warrick, et al, "IBM Total Storage Enterprise Storage Server Implementing ESS Copy Services in Open Environments", 642 pgs, IBM Jul. 2004.
Webster's New World Dictionary, Dictionary of Computer Terms, Sixth Edition, (4 pages).
Notice of Allowance for U.S. Appl. No. 13/175,892 mailed Dec. 23, 2014.
US Office Action dated Apr. 18, 2014 in related U.S. Appl. No. 13/175,892, filed Jul. 4, 2011.
US Office Action dated Jul. 17, 2014 in related U.S. Appl. No. 13/175,898, filed Jul. 7, 2011.
US Office Action on U.S. Appl. No. 13/039,446 dated Jan. 2, 2015.
US Office Action on U.S. Appl. No. 14/687,341 dated Mar. 3, 2016.
Notice of Allowance for U.S. Appl. No. 13/175,892 dated Apr. 3, 2015.
US Office Action for U.S. Appl. No. 13/175,898 mailed Mar. 25, 2015.
US Final Office Action on U.S. Appl. No. 13/175,892 dated Apr. 8, 2016.
US Notice of Allowance on U.S. Appl. No. 13/367,456 dated May 11, 2016.
US Office Action on 103564-0103 DTD Sep. 1, 2015.
US Office Action on 103564-0108 DTD Sep. 1, 2015.
US Office Action on 103564-0112 DTD Oct. 1, 2015.
US Office Action on 103564-0121 DTD Sep. 11, 2015.
"Zerto Hits Triple-Digit Growth Once Againl Builds Toward a Future of Uninterrupted Technology," Zerto, Feb. 3, 2015, 2 pages.
A Comparison of Hypervisor-based Replication vs. Current and Legacy BC/DR Technologies, 2012.
Choosing a VSS Provider Veeam Backup Guide for HyperV, Mar. 18, 2015.
Data Loss Avoidance: Near Continuous Data Protection and Streamlined Disaster Recovery, www.veeam.com.
Defendant Zerto, Inc's Motion for Judgment as a Matter of Law of No Willful Infringement of the '867 Patent Apr. 30, 2015.
Deploy Hyper-V Replica, published May 31, 2012.
Double-Take Availability for vSphere: Technical Data Sheet, 2014.
EMC Recoverpoint Family, 2012.
EMC Recoverpoint for Virtual Machines: Protects and Recovers VMs to Any Point in Time, 2012.
EMC's Answering Brief in Opposition of Zerto's Renewed Motion for Judgment as a Matter of Law or, in the Alternative, for a New Trial, Jul. 17, 2015.
EMC's Answering Brief in Opposition to Zerto's Motion for a New Trial and to Alter or Amend the Judgment, due to an Inconsistent Verdict, Jul. 17, 2015.
EMC's Opening Brief in Support of Its Motion for an Accounting and to Amend the Judgment, Jun. 24, 2015.
EMC's Opening Brief in Support of Its Renewed Motion for Judgment as a Matter of Law, Jun. 5, 2015.
Failed to Create a Quiesced Snapshot of a VM, Nov. 5, 2014, http://nakivo.com.
Features Nakivo Backup and Replication, accessed Jul. 7, 2015, http:www/nakivo.com/VMware-VM-backup-replication-features.htm.
HP 3PAR Remote Copy Software User Guide HP 3PAR OS 3.2.1 MU2, copyright 2009.
HP 3PAR Remote Copy Software, 2015, www.hp.com.
Hyper-V Replica Feature Overview, published Feb. 29, 2012.
Is Synchronous Replication Enough, May 29, 2013, http://www.zerto.com/blog/general/is-synchronous-replication-enough.
Judgment, May 21, 2015.
Letter regarding EMC's Request to File Summary Judgment Motions—Redacted, dated Feb. 13, 2015, 120 pages.
Letter to Judge Sleet re. *EMC Corporation* v. *Zerto, Inc.*, Feb. 6, 2015.
Letter to Judge Sleet Regarding EMC's Request for Summary Judgment, Oct. 21, 2014, 120 pages.
Managing VM Data with Tintri, Phillips, John, 2013.
Metro Mirror and Global Mirror.
Plaintiff's Motion for Judgment as a Matter of Law Pursuant to Fed. R. Civ. P. 50(a), May 6, 2015.
ReplicateVM, Replicate VMs, not LUNS, Jul. 7, 2015, http://www.tintri.com/producs/replicatevm.
Report on The Filing or Determination of an Action Regarding a Patent or Trademark, May 22, 2015.
Scalable, High-Performance, and Cost-Effective Remote Replication on Hitachi Unified Storage and Brocade Extension Platforms, 2012, www.brocade.com.
Unitrends Enterprise Backup Software and Solutions, 2015, http://www.unitrends.com/products/enterprise-backup-software/unitrends-enterprise-backup.
Unitrends Release 7.3 Beta Now Available, Nov. 26, 2013, http://blogs.unitrends.com/unitrends-release-7-3-beta-now-available/.
Using Double-Take Software and the Virtual Recovery Appliance, http://www.discoposse.com/index.php/category/technology/.

(56) References Cited

OTHER PUBLICATIONS

Veeam Backup and Replication v8, www.veeam.com.
VMware ESXi and ESX Replication for Simple Fast Disaster Recovery, http://software.dell.com/products/vreplicator/.
VMware vCenter Site Recovery Manager5 with vSphere Replication, 2011.
VMware vSphere Replication 6.0, Apr. 2015.
vReplicator Version 3.0, 2009.
Zerto Announces General Availability of Zerto Virtual Replication Version 4.0, May 5, 2015.
Zerto Inc.'s Motion for Judgment as a Matter of Law, May 6, 2015.
Zerto Raises 26 Million in Series D Financing to Accelerate Hybrid Cloud Adoption, Jun. 18, 2014.
Zerto Virtual Replication Release Notes, 2015.
Zerto, Inc's Brief in Support of Its Motion for a New Trial, and to Alter or Amend The Judgment, Due to an Inconsistent Verdict, Jun. 19, 2015.
Zerto, Inc's Brief in Support of Its Renewed Motion for Judgment as a Matter of Law or, In The Alternative, For a New Trial, Jun. 19, 2015.
Zerto's Hypervisor-based Replication: A New Approach to Business/Continuity Disaster Recovery, 2012.
Zerto's Hypervisor-Based, Enterprise-Class Replication and Continuous Data Protection, 2012.
Zerto's Protect Applications, Not Just Data: BC/DR for Virtualized Applications, 2012.
Zerto's ZVR and Hyper-V, 2014.

* cited by examiner

MULTI-RPO DATA PROTECTION

CROSS REFERENCES TO RELATED APPLICATIONS

This application is a continuation-in-part of U.S. application Ser. No. 13/175,898, entitled METHODS AND APPARATUS FOR PROVIDING HYPERVISOR LEVEL DATA SERVICES FOR SERVER VIRTUALIZATION, filed on Jul. 4, 2011 by inventors Ziv Kedem, Gil Levonai, Yair Kuszpet and Chen Burshan, which is a continuation-in-part of U.S. application Ser. No. 13/039,446, entitled METHODS AND APPARATUS FOR PROVIDING HYPERVISOR LEVEL DATA SERVICES FOR SERVER VIRTUALIZATION, filed on Mar. 3, 2011 by inventor Ziv Kedem, which claims priority benefit of U.S. Provisional Application No. 61/314,589, entitled METHODS AND APPARATUS FOR PROVIDING HYPERVISOR LEVEL DATA SERVICES FOR SERVER VIRTUALIZATION, filed on Mar. 17, 2010 by inventor Ziv Kedem.

FIELD OF THE INVENTION

The present invention relates to data protection.

BACKGROUND OF THE INVENTION

Data is at the heart of every enterprise, and a core component of data center infrastructure. As data applications become more and more critical, there is a growing need to ensure complete business continuity.

Disaster recovery systems provide data protection and application recovery. Some disaster recovery systems use virtual data replication within a hypervisor architecture, and are able to recover any point in time.

Objectives of disaster recovery plans are generally formulated in terms of recovery point objective (RPO) and recovery time objective (RTO).

RPO is a point in time to which data must be recovered. RPO indicates an amount of data that an enterprise determines is an acceptable loss in a disaster situation. RPO allows an enterprise to define a window of time before a disaster during which data may be lost. The value of the data in this window of time may be weighed against the cost of the additional disaster prevention measures that would be necessary to shorten the window.

RTO is the time it takes to get a non-functional system back on-line, and indicates how fast the enterprise will be up and running after a disaster. Specifically, RTO is the duration of time within which a business process must be restored after a disaster, in order to avoid unacceptable consequences associated with a break in business continuity. Most disaster recovery systems provide RTOs on the order of several hours.

RPO is independent of RTO. If the RPO of an enterprise is two hours, then when a system is brought back on-line after a disaster, all data must be restored to a point within two hours before the disaster. But the enterprise has acknowledged that data in the two hours immediately preceding the disaster may be lost; i.e., the acceptable loss window is two hours.

Conventional disaster recovery systems are single-RPO systems; i.e., a single RPO objective applies. In this regard, reference is made to FIG. 1, which is a screen shot of a prior art single-RPO console for a disaster recovery application.

As shown in FIG. 1, a single RPO objective designates an RPO threshold time of 2 minutes, and a maintenance history of 4 hours.

An enterprise may share its overall bandwidth between its actual production system, and its disaster recovery system. A RPO may be controlled by the amount of bandwidth of the overall enterprise system allocated to the disaster recovery system. By allocating more bandwidth to the disaster recovery system, the RPO may be improved to reduce the window of data loss in case of disaster, but less bandwidth is then available for the enterprise production system. Conversely, by allocating less bandwidth to the disaster recovery system, the RPO is degraded to increase the window of data loss in case of disaster, and more bandwidth is then available for the enterprise production system.

When a disaster recovery system falls short of its RPO objective, it issues an RPO alert. If an administrator receives a series of RPO alerts, it generally means that the bandwidth allocated to the disaster recovery system is insufficient for the RPO objective, and the RPO objective must be relaxed or additional bandwidth must be allocated. Generally, allocating additional bandwidth to the disaster recovery system entails the expense of obtaining additional bandwidth for the overall enterprise system, in order not to degrade the enterprise production system.

Enterprise production systems generate data at varying rates, according to peaks times and off-peak times. Peak times and off-peak times may be different for different applications. E.g., a customer relationship management (CRM) application may have peak times during normal working hours and off-peak times during nights and weekends, whereas a fast-food ordering system may have peak hours during nights and weekends. Maintaining a low RPO at all times requires a WAN link with a bandwidth that accommodates the peak rates. Such lines are expensive, and are fully utilized only during relatively short time periods.

Cloud service disaster recovery systems support multiple enterprises. Maintaining high bandwidth lines for all enterprises is expensive, and does not fully utilize the lines most of the time. Reducing the bandwidth results in system alerts when the RPO is exceeded—alerts that the system administrator wants to avoid. Increasing the RPO results in missing alerts that should be issued.

It would thus be of advantage to enable a disaster recovery system to designate different RPO objectives based on the day and the time of day, with different respective bandwidths allocated to the disaster recovery system.

SUMMARY OF THE DESCRIPTION

Aspects of the present invention overcome drawbacks with conventional single-RPO disaster recovery systems, and provide multi-RPO disaster recovery systems, for designating multiple RPO objectives based on day and time of day, with multiple respective bandwidths allocated to the disaster recovery systems. Aspects of the present invention provide disaster recovery systems with calendar-based, or date and time-based, RPO objectives and bandwidth allocations, thereby achieving greater flexibility and cost effectiveness vis-à-vis conventional single-RPO systems.

Using the present invention, a disaster recovery system may share a link between sites for replication and applications. The disaster recovery system may set a higher RPO objective during peak times and a lower RPO objective during off-peal times, limit replication bandwidth during peak times, and relax replication bandwidth during off-peak times. The disaster recovery system may use the different RPO objectives to advantage for allowing as much bandwidth as possible, taking into account that a higher RPO objective is met during peak times, while catching up afterwards during off-peak times when the RPO objective is lower.

Conversely, the disaster recovery system may set a lower RPO objective during peak times and a higher RPO objective during off-peak times, to enable sharing the link with other systems during off-peak times.

In accordance with an embodiment of the present invention, a control element is installed, to control bandwidth at a site level, protection group level. The control element monitors RPO objective and corresponding allocated bandwidth in accordance with a calendar-based, or a date and time-based schedule.

In accordance with an embodiment of the present invention, a disaster recovery system may set different limits for data seeding traffic vs. data replication traffic over a WAN.

There is thus provided in accordance with an embodiment of the present invention a system for disaster recovery including a controller (i) for controlling bandwidth usage of a disaster recovery system in accordance with a plurality of recovery point objectives (RPOs), each RPO designating a maximal time loss constraint for data recovery for an enterprise production system, and a corresponding bandwidth allocation for the disaster recovery system to use in replicating data for the enterprise production system, wherein the RPOs are applied in accordance with a calendar-based schedule of dates and times, and (ii) for issuing an RPO alert when the RPO maximal time loss constraint for a current date and time is not satisfied.

There is additionally provided in accordance with an embodiment of the present invention a method for disaster recovery, including accessing a calendar-based schedule of recovery point objectives (RPOs) and corresponding bandwidth allocations for a disaster recovery system, each RPO designating a maximal time loss constraint for data recovery for an enterprise production system, and each bandwidth allocation constraining bandwidth usage for replicating data for the enterprise production system, retrieving, by the disaster recovery system at any given date and time, the recovery point objective (RPO) and the corresponding bandwidth allocation for the given date and time, from the calendar-based schedule, limiting, by the disaster recovery system at the given date and time, bandwidth usage of the disaster recovery system in accordance with the retrieved bandwidth allocation, determining, by the disaster recovery system, a current RPO, and if the current RPO exceeds the retrieved RPO, then issuing, by the disaster recovery system, an RPO alert.

BRIEF DESCRIPTION OF THE DRAWINGS

The present invention will be more fully understood and appreciated from the following detailed description, taken in conjunction with the drawings in which.

LIST OF APPENDICES

Appendix I is an application programming interface for virtual replication site controller web services, in accordance with an embodiment of the present invention;

Appendix II is an application programming interface for virtual replication host controller web services, in accordance with an embodiment of the present invention;

Appendix III is an application programming interface for virtual replication protection group controller web services, in accordance with an embodiment of the present invention;

Appendix IV is an application programming interface for virtual replication command tracker web services, in accordance with an embodiment of the present invention; and Appendix V is an application programming interface for virtual replication log collector web services, in accordance with an embodiment of the present invention.

DETAILED DESCRIPTION

Aspects of the present invention relate to disaster recovery with multiple RPOs that are applied in accordance with a schedule of dates and times.

Figure 1:
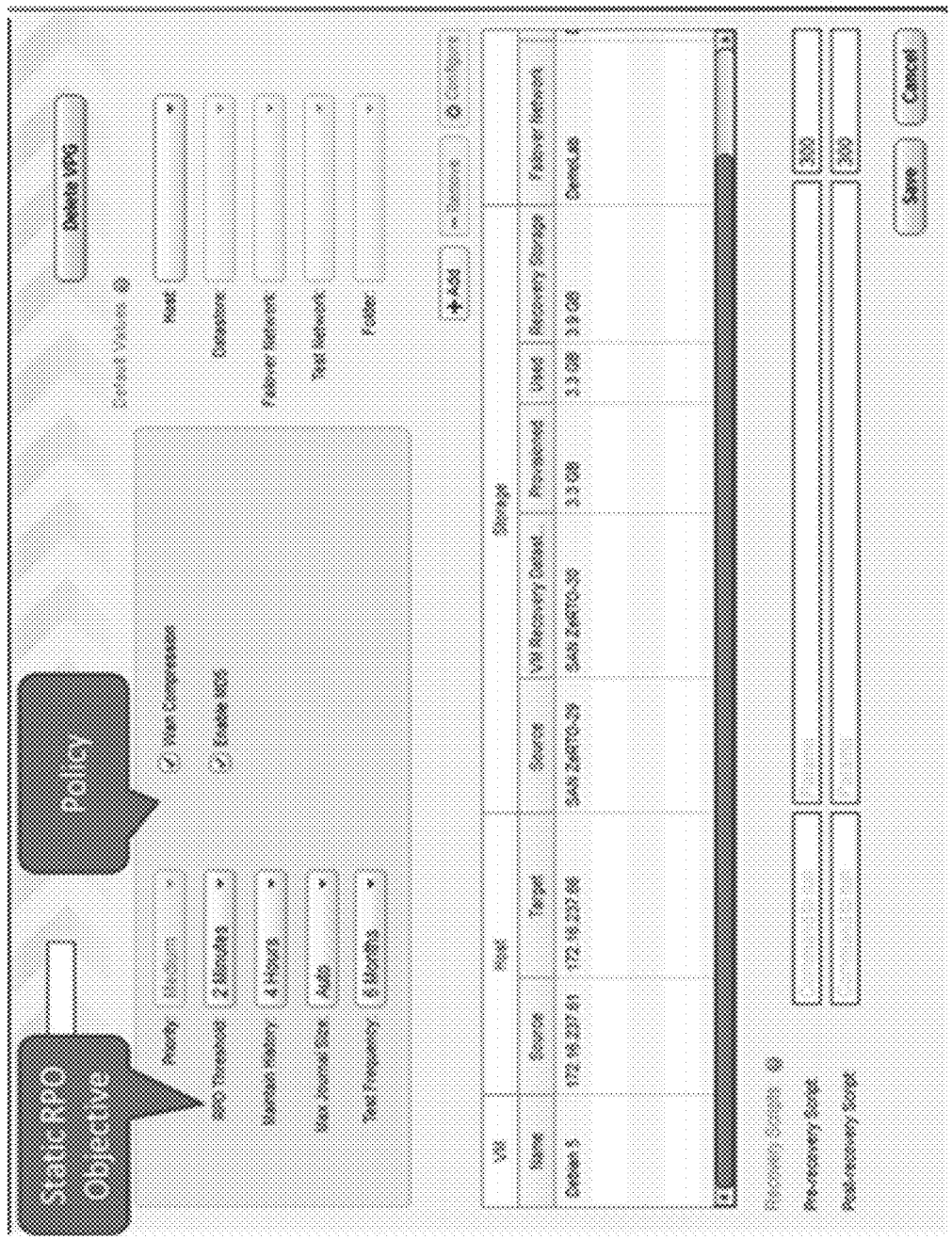
FIG. 1 is a screen shot of a prior art single-RPO console for a disaster recovery application.
Figure 2:
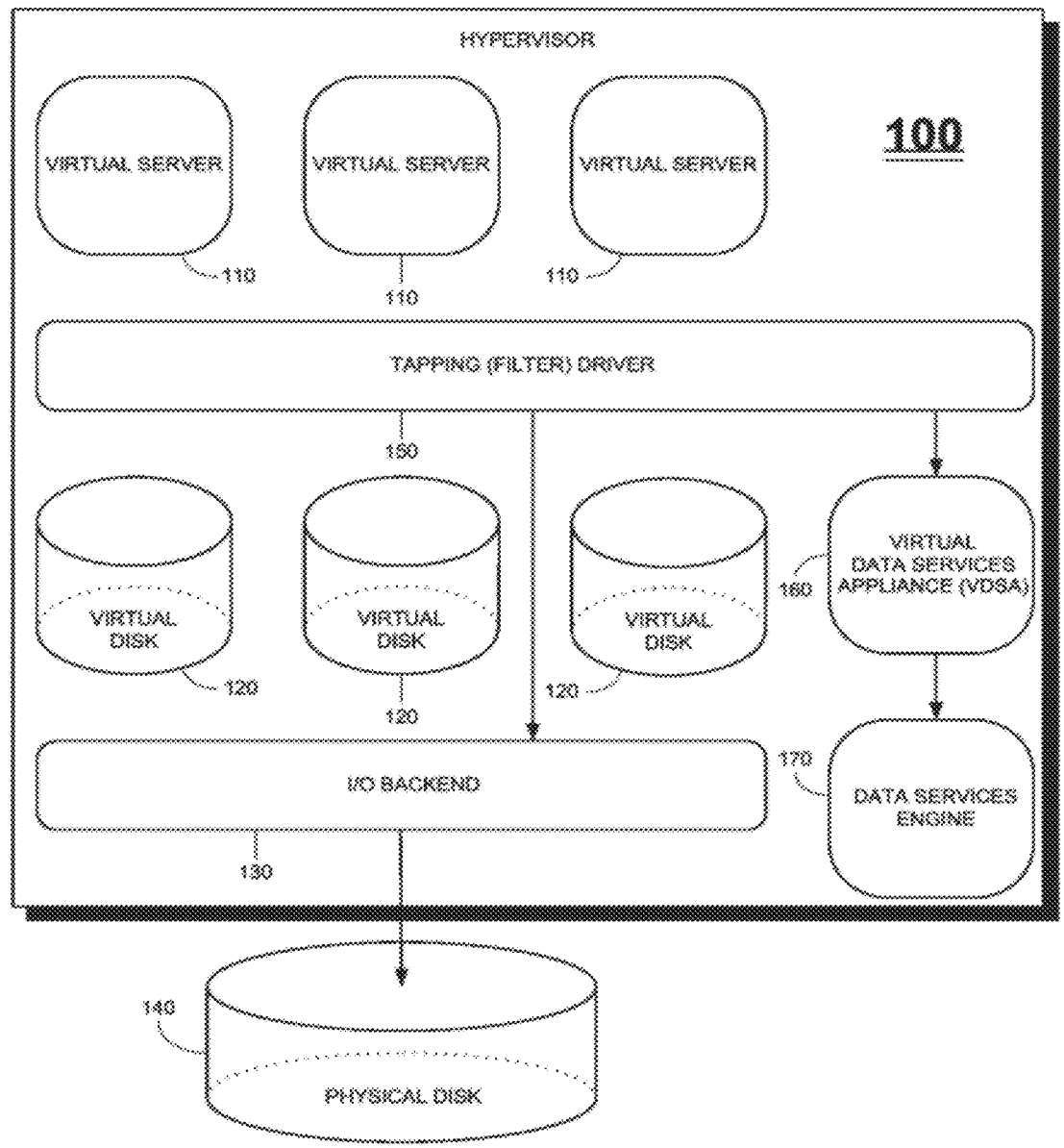
FIG. 2 is a simplified block diagram of a hypervisor architecture that includes a tapping driver and a virtual data services appliance, in accordance with an embodiment of the present invention.

Reference is made to FIG. 2, which is a simplified block diagram of a hypervisor architecture that includes a tapping driver and a VDSA, in accordance with an embodiment of the present invention. Shown in FIG. 2 is a hypervisor 100 with three virtual servers 110, three virtual disks 120, an I/O backend 130 and a physical storage array 140. Hypervisor 100 uses a single physical server, but runs multiple virtual servers 110. Virtual disks 120 are a storage emulation layer that provide storage for virtual servers 110. Virtual disks 120 are implemented by hypervisor 100 via I/O backend 130, which connects to physical disk 140.

Hypervisor 100 also includes a tapping driver 150 installed within the hypervisor kernel. As shown in FIG. 2, tapping driver 150 resides in a software layer between virtual servers 110 and virtual disks 120. As such, tapping driver 150 is able to access I/O requests performed by virtual servers 110 on virtual disks 120. Tapping driver 150 has visibility to I/O requests made by virtual servers 110.

Hypervisor 100 also includes a VDSA 160. In accordance with an embodiment of the present invention, a VDSA 160 runs on a separate virtual server within each physical hypervisor. VDSA 160 is a dedicated virtual server that provides data services via one or more data services engines 170. However, VDSA 160 does not reside in the actual I/O data path between I/O backend 130 and physical disk 140. Instead, VDSA 160 resides in a virtual I/O data path.

Whenever a virtual server 110 performs I/O on a virtual disk 120, tapping driver 150 identifies the I/O requests that the virtual server makes. Tapping driver 150 copies the I/O requests, forwards one copy via the conventional path to I/O backend 130, and forwards another copy to VDSA 160. In turn, VDSA 160 enables the one or more data services engines 170 to provide data services based on these I/O requests.

Figure 3:
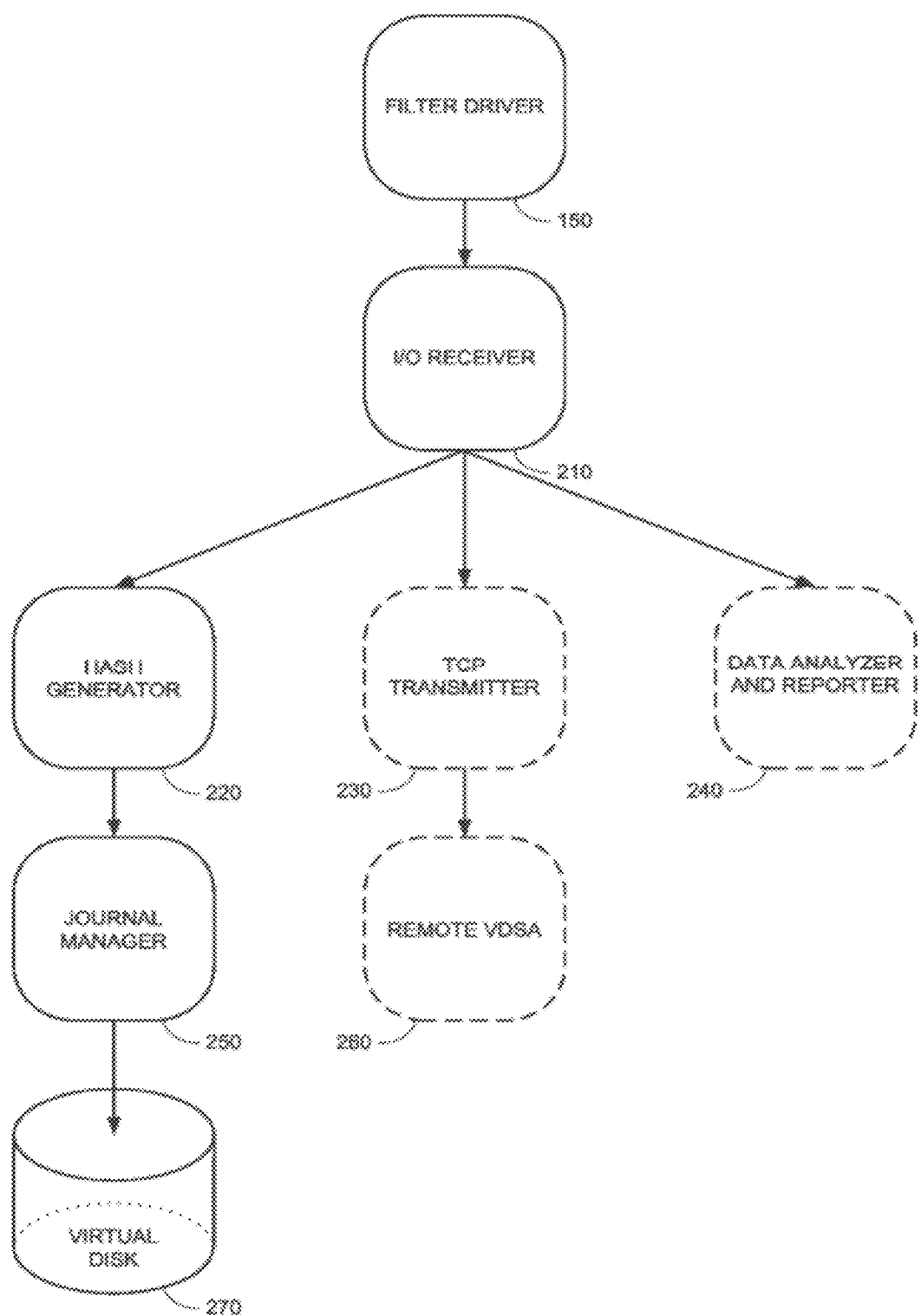
FIG. 3 is a simplified data flow chart for a virtual data services appliance, in accordance with an embodiment of the present invention.

Reference is made to FIG. 3, which is a simplified data flow chart for a VDSA, in accordance with an embodiment of the present invention. Shown in FIG. 3 are an I/O receiver 210, a hash generator 220, a TCP transmitter 230, a data analyzer and reporter 240, a journal manager 250 and a remote VDSA 260. Remote VDSA 260 resides on different physical hardware, at a possibly different location.

As shown in FIG. 3, I/O receiver 210 receives an intercepted I/O request from tapping driver 150. VDSA 160 makes up to three copies of the received I/O requests, in order to perform a set of actions which enable the one or more data services engines 170 to provide various services.

A first copy is stored in persistent storage, and used to provide continuous data protection. Specifically, VDSA 160 sends the first copy to journal manager 250, for storage in a dedicated virtual disk 270. Since all I/O requests are journaled on virtual disk 270, journal manager 250 provides recovery data services for virtual servers 110, such as restoring virtual servers 110 to an historical image. In order to conserve disk space, hash generator 220 derives a one-way hash from the I/O requests. Use of a hash ensures that only a single copy of any I/O request data is stored on disk.

An optional second copy is used for disaster recovery. It is sent via TCP transmitter 230 to remote VDSA 260. As such, access to all data is ensured even when the production hardware is not available, thus enabling disaster recovery data services.

An optional third copy is sent to data analyzer and reporter 240, which generates a report with information about the content of the data. Data analyzer and reporter 240 analyzes data content of the I/O requests and infers information regarding the data state of virtual servers 110. E.g., data analyzer and reporter 240 may infer the operating system level and the status of a virtual server 110.

Figure 4:
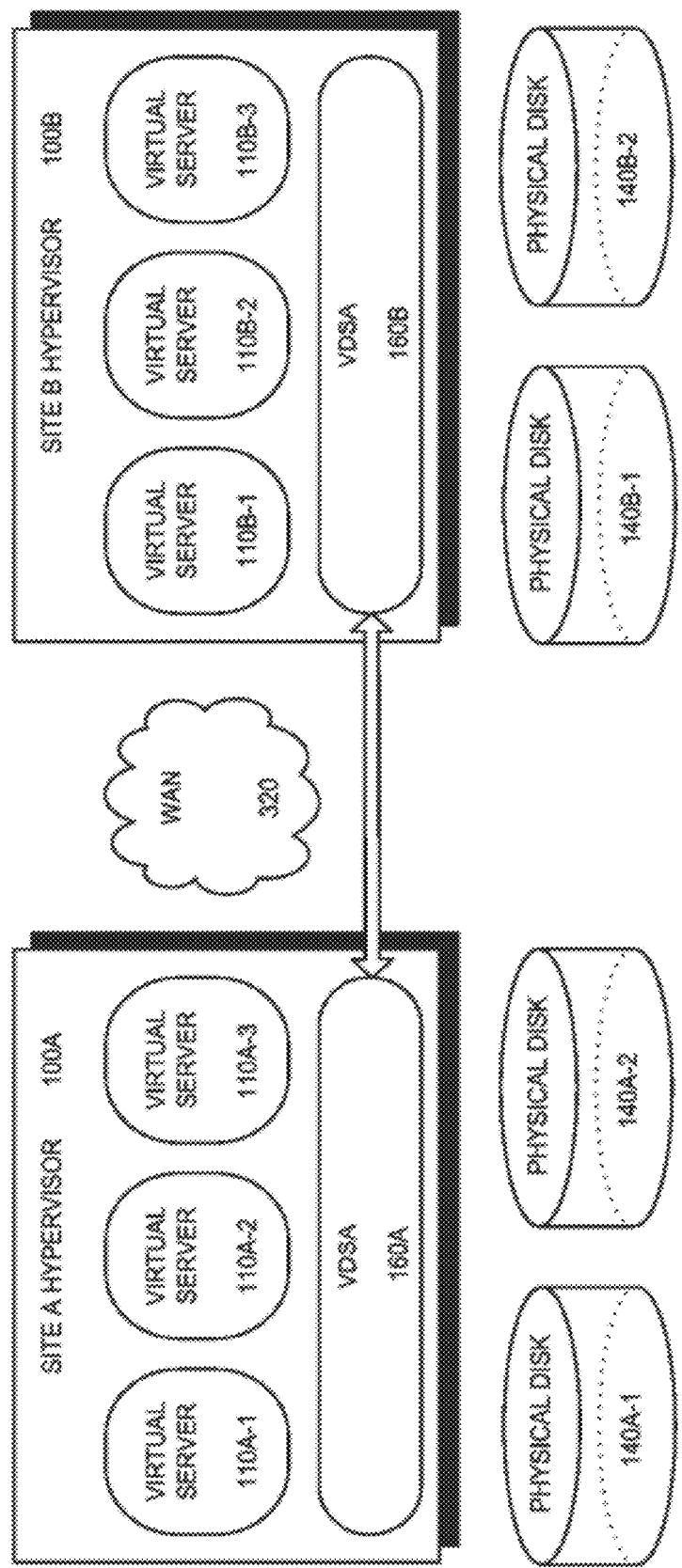
FIG. 4 is a simplified block diagram of a virtual replication system, in accordance with an embodiment of the present invention.

Reference is made to FIG. 4, which is a simplified block diagram of a virtual replication system, in accordance with an embodiment of the present invention. Shown in FIG. 4 is a protected site designated Site A, and a recovery site designated Site B. Site A includes a hypervisor 100A with three virtual servers 110A-1, 110A-2 and 110A-3, and a VDSA 160A. Site A includes two physical disks 140A-1 and 140A-2. Site B includes a hypervisor 100B with a VDSA 160B. Site B includes two physical disks 140B-1 and 140B-2. All or some of virtual servers 110A-1, 110A-2 and 110A-3 may be designated as protected. Once a virtual server is designated as protected, all changes made on the virtual server are replicated at the recovery site.

In accordance with an embodiment of the present invention, every write command from a protected virtual server in hypervisor 100A is intercepted by tapping driver 150 (FIG. 2) and sent asynchronously by VDSA 160A to VDSA 160B for replication, via a wide area network (WAN) 320, while the write command continues to be processed by the protected server.

At Site B, the write command is passed to a journal manager 250 (FIG. 3), for journaling on a Site B virtual disk 270 (FIG. 3). After every few seconds, a checkpoint is written to the Site B journal, and during a recovery one of the checkpoints may be selected for recovering to that point. Additionally, checkpoints may be manually added to the Site B journal by an administrator, along with a description of the checkpoint. E.g., a checkpoint may be added immediately prior to an event taking place that may result in the need to perform a recovery, such as a planned switch over to an emergency generator.

In addition to write commands being written to the Site B journal, mirrors 110B-1, 110B-2 and 110B-3 of the respective protected virtual servers 110A-1, 110A-2 and 110A-3 at Site A are created at Site B. The mirrors at Site B are updated at each checkpoint, so that they are mirrors of the corresponding virtual servers at Site A at the point of the last checkpoint. During a failover, an administrator can specify that he wants to recover the virtual servers using the latest data sent from the Site A. Alternatively the administrator can specify an earlier checkpoint, in which case the mirrors on the virtual servers 110B-1, 110-B-2 and 110B-3 are rolled back to the earlier checkpoint, and then the virtual servers are recovered to Site B. As such, the administrator can recover the environment to the point before any corruption, such as a crash or a virus, occurred, and ignore the write commands in the journal that were corrupted.

VDSAs 160A and 160B ensure write order fidelity; i.e., data at Site B is maintained in the same sequence as it was written at Site A. Write commands are kept in sequence by assigning a tinnestanrip or a sequence number to each write at Site A. The write commands are sequenced at Site A, then transmitted to Site B asynchronously, then reordered at Site B to the proper time sequence, and then written to the Site B journal.

The journal file is cyclic; i.e., after a pre-designated time period, the earliest entries in the journal are overwritten by the newest entries.

It will be appreciated by those skilled in the art that the virtual replication appliance of the present invention operates at the hypervisor level, and thus obviates the need to consider physical disks. In distinction, conventional replication systems operate at the physical disk level. Embodiments of the present invention recover write commands at the application level. Conventional replication systems recover write commands at the SCSI level. As such, conventional replication systems are not fully application-aware, whereas embodiment of the present invention are full application-aware, and replicate write commands from an application in a consistent manner.

The present invention offers many advantages.

Hardware Agnostic: Because VDSA 160 manages recovery of virtual servers and virtual disks, it is not tied to specific hardware that is used at the protected site or at the recovery site. The hardware may be from the same vendor, or from different vendors. As long as the storage device supports the iSCSI protocol, any storage device, known today or to be developed in the future, can be used.

Fully Scalable: Because VDSA 160 resides in the hypervisor level, architectures of the present invention scale to multiple sites having multiple hypervisors, as described hereinbelow with reference to FIG. 5.

Efficient Asynchronous Replication: Write commands are captured by VDSA 160 before they are written to a physical disk at the protected site. The write commands are sent to the recovery site asynchronously, and thus avoid long distance replication latency. Moreover, only delta changes are sent to the recovery site, and not a whole file or disk, which reduces the network traffic, thereby reducing WAN requirements and improving recovery time objective and recovery point objective.

Control of Recovery: An administrator controls when a recovery is initiated, and to what point in time it recovers.

Near-Zero Recovery Point Objective (RPO): VDSA 160 continuously protects data, sending a record of every write command transacted at the protected site to the recovery site. As such, recovery may be performed within a requested RPO.

Near-Zero Recovery Time Objective (RTO): During recovery the mirrors of the protected virtual servers are recovered at the recovery site from VDSA 160B, and synchronized to a requested checkpoint. In accordance with an embodiment of the present invention, during synchronization and while the virtual servers at the recovery site are not yet fully synchronized, users can nevertheless access the virtual servers at the recovery site. Each user request to a virtual server is analyzed, and a response is returned either from the virtual server directly, or from the journal if the information in the journal is more up-to-date. Such analysis of user requests continues until the recovery site virtual environment is fully synchronized.

WAN Optimization between Protected and Recovery Sites: In accordance with an embodiment of the present invention, write commands re compressed before being sent from VDSA 160A to VDSA 160B, with throwing used to prioritize network traffic. As such, communication between the protected site and the recovery site is optimized.

WAN Failover Resilience: In accordance with an embodiment of the present invention, data is cached prior to being transmitted to the recovery site. If WAN 320 goes down, the cached data is saved and, as soon as WAN 320 comes up again, the data is sent to the recovery site and both sites are re-synchronized.

Single Point of Control: In accordance with an embodiment of the present invention, both the protected and the recovery site are managed from the same client console.

Secure Multi-Tenant Solution on Shared Hardware: The present invention enables multiple enterprises to use shared hardware at a recovery site for data replication, while maintaining security between the enterprises, as described hereinbelow with reference to FIGS. 10-13.

Figure 5:
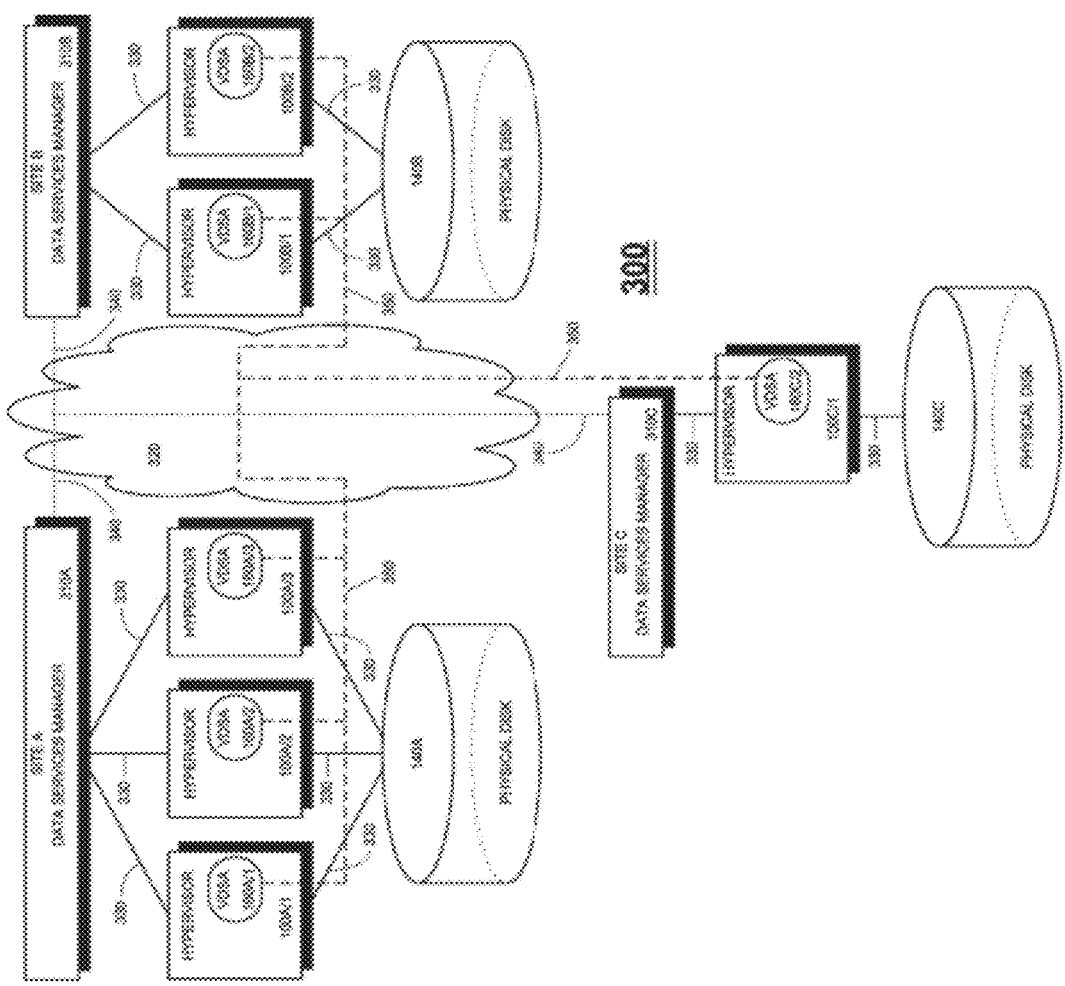
FIG. 5 is a simplified block diagram of a cross-host multiple hypervisor system that includes data services managers for multiple sites that have multiple hypervisors, in accordance with an embodiment of the present invention.

As indicated hereinabove, the architecture of FIG. 2 scales to multiple sites having multiple hypervisors. Reference is made to FIG. 5, which is a simplified block diagram of a cross-host multiple hypervisor system 300 that includes data services managers for multiple sites that have multiple hypervisors, in accordance with an embodiment of the present invention. The architecture of FIG. 5 includes three sites, designated Site A, Site B and Site C, the three sites being communicatively coupled via a network 320. Each site includes one or more hypervisors 100. Specifically, Site A includes three hypervisors, 100A/1, 100A/2 and 100A/3, Site B includes two hypervisors, 100B/1 and 100B/2, and Site C includes one hypervisor 100C/1. The sites have respective one or more physical disks 140A, 140B and 140C.

Figure 8:
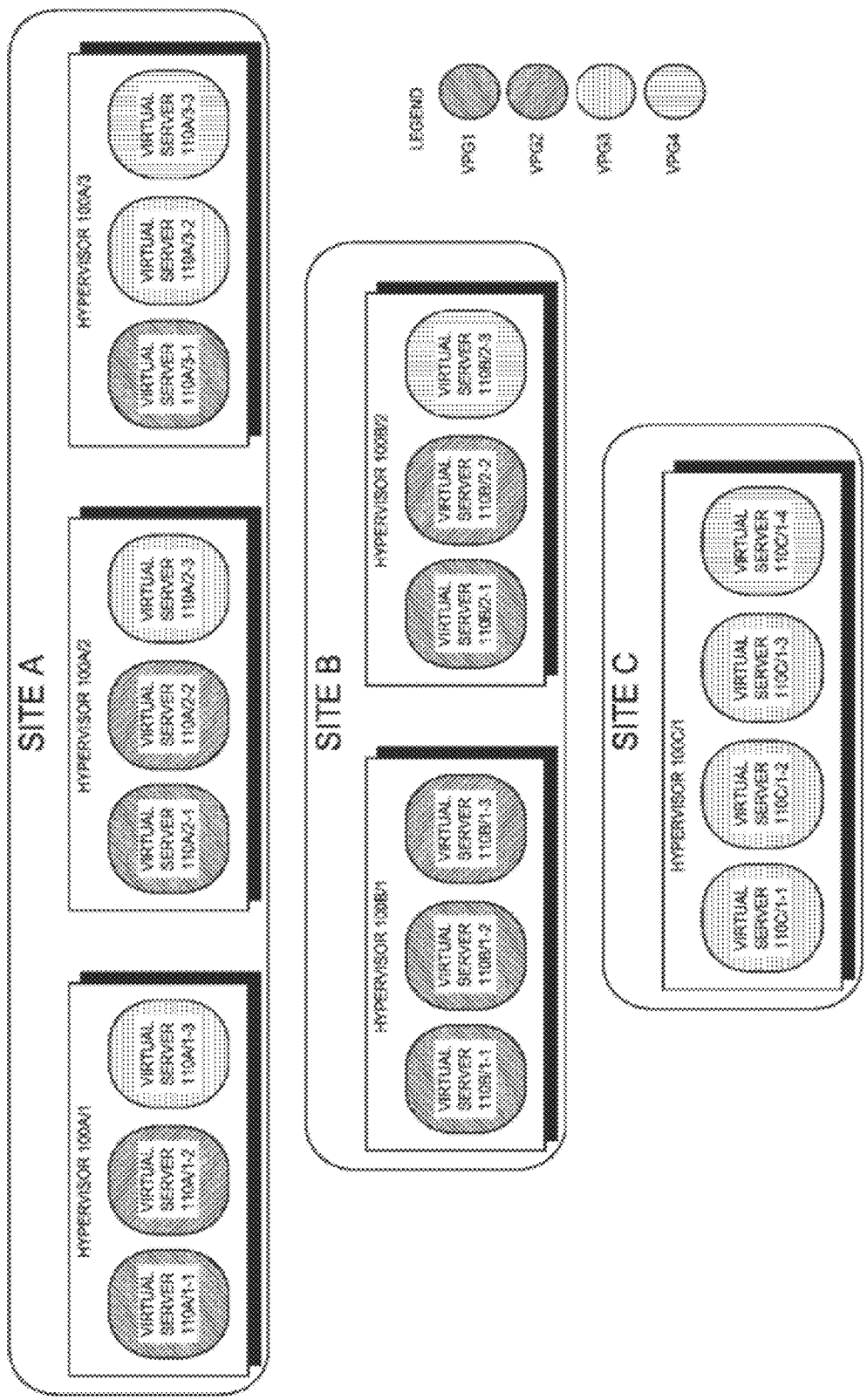
FIG. 8 is an example an environment for the system of FIG. 4, in accordance with an embodiment of the present invention.

The hypervisors are shown in system 300 with their respective VDSA's 160A/1, 160A/2, . . . , and the other components of the hypervisors, such as the virtual servers 110 and virtual disks 120, are not shown for the sake of clarity. An example system with virtual servers 110 is shown in FIG. 8, and described hereinbelow.

The sites include respective data services managers 310A, 310B and 310C that coordinate hypervisors in the sites, and coordinate hypervisors across the sites.

The system of FIG. 5 may be used for data replication, whereby data at one site is replicated at one or more other sites, for protection. The solid communication lines 330 in FIG. 5 are used for in-site traffic, the dashed communication lines 340 are used for replication traffic between sites, and the dotted communication lines 350 are used for control traffic between data services managers.

Data services managers 310A, 310B and 310C are control elements. The data services managers at each site communicate with one another to coordinate state and instructions. The data services managers track the hypervisors in the environment, and track health and status of the VDSAs 160A/1, 160A/2, . . . .

It will be appreciated by those skilled in the art that the environment shown in FIG. 5 may be re-configured by moving one or more virtual servers 110 from one hypervisor 100 to another, by moving one or more virtual disks 120 from one hypervisor 100 to another, and by adding one or more additional virtual servers 110 to a hypervisor 100.

In accordance with an embodiment of the present invention, the data services managers enable designating groups of specific virtual servers 110, referred to as virtual protection groups, to be protected. For virtual protection groups, write order fidelity is maintained. The data services managers enable designating a replication target for each virtual protection group; i.e., one or more sites, and one or more hypervisors in the one or more sites, at which the virtual protection group is replicated. A virtual protection group may have more than one replication target. The number of hypervisors and virtual servers within a virtual protection group and its replication target are not required to be the same.

Figure 6:
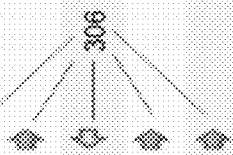
FIG. 6 is a user interface screenshot of bi-directional replication of virtual protection groups, in accordance with an embodiment of the present invention.

Reference is made to FIG. 6, which is a user interface screenshot of bi-directional replication of virtual protection groups, in accordance with an embodiment of the present invention. Shown in FIG. 4 are virtual protection groups 301 ("Exchange"), 302 ("WebApp"), 303 ("Dummy-R1"), 304 ("Windows 2003") and 305 (Dummies-L"). Arrows 306 indicate direction of replication.

Figure 7:
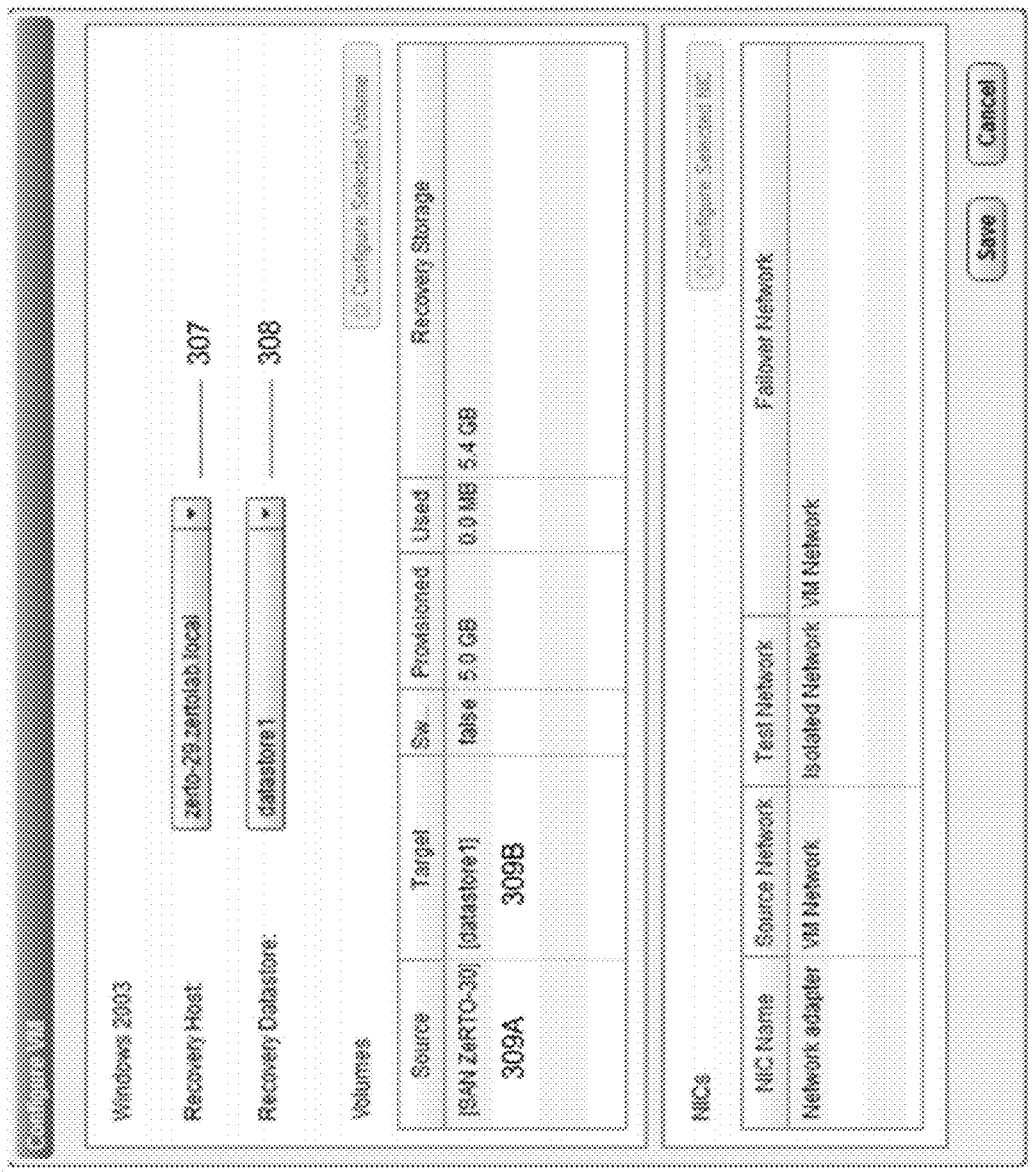
FIG. 7 is a user interface screenshot of assignment of a replication target for a virtual protection group, in accordance with an embodiment of the present invention.

Reference is made to FIG. 7, which is a user interface screenshot of assignment of a replication target for a virtual protection group, in accordance with an embodiment of the present invention. Shown in FIG. 7 is an entry 307 for designating a recovery host, and an entry 308 for designating a recovery datastore for virtual protection group 304 ("Windows 2003") of FIG. 6. Respective source and target datastores, [SAN ZeRTO-30] 309A and [datastore1] 309B, are shown as being paired.

More generally, the recovery host may be assigned to a cluster, instead of to a single hypervisor, and the recovery datastore may be assigned to a pool of resources, instead of to a single datastore. Such assignments are of particular advantage when different enterprises share the same physical infrastructure for target replication, as such assignments mask the virtual infrastructure between the different enterprises.

The data services managers synchronize site topology information. As such, a target site's hypervisors and datastores may be configured from a source site.

Virtual protection groups enable protection of applications that run on multiple virtual servers and disks as a single unit. E.g., an application that runs on virtual servers many require a web server and a database, each of which run on a different virtual server than the virtual server that runs the application. These virtual servers may be bundled together using a virtual protection group.

Referring back to FIG. 5, data services managers 310A, 310B and 310C monitor changes in the environment, and automatically update virtual protection group settings accordingly. Such changes in the environment include inter alia moving a virtual server 110 from one hypervisor 100 to another, moving a virtual disk 120 from one hypervisor 100 to another, and adding a virtual server 110 to a hypervisor 100.

For each virtual server 110 and its target host, each VDSA 160A/1, 160A/2, . . . replicates IOs to its corresponding replication target. The VDSA can replicate all virtual servers to the same hypervisor, or to different hypervisors. Each VDSA maintains write order fidelity for the IOs passing through it, and the data services manager coordinates the writes among the VDSAs.

Since the replication target hypervisor for each virtual server 110 in a virtual protection group may be specified arbitrarily, all virtual servers 110 in the virtual protection group may be replicated at a single hypervisor, or at multiple hypervisors. Moreover, the virtual servers 110 in the source site may migrate across hosts during replication, and the data services manager tracks the migration and accounts for it seamlessly.

Reference is made to FIG. 8, which is an example an environment for system 300, in accordance with an embodiment of the present invention. As shown in FIG. 8, system 300 includes the following components.

Site A
Hypervisor 100A/1: virtual servers 110A/1-1, 110A/1-2, 110A/1-3.
Hypervisor 100A/2: virtual servers 110A/2-1, 110A/2-2, 110A/2-3.
Hypervisor 100A/3: virtual servers 110A/3-1, 110A/3-2, 110A/3-3.

Site B
Hypervisor 100B/1: virtual servers 110B/1-1, 110B/1-2, 110B/1-3.
Hypervisor 100B/2: virtual servers 110B/2-1, 110B/2-2, 110B/2-3.

Site C
Hypervisor 100C/1: virtual servers 110C/1-1, 110C/1-2, 110C/1-3, 110C/1-4.

As further shown in FIG. 8, system 300 includes the following virtual protection groups. Each virtual protection group is shown with a different hatching, for clarity.
VPG1 (Shown with Upward-sloping Hatching)
    Source at Site A: virtual servers 110A/1-1, 110A/2-1, 110A/3-1
    Replication Target at Site B: virtual servers 110B/1-1, 110B/1-2, 110B/2-1
VPG2 (Shown with Downward-sloping Hatching)
    Source at Site B: virtual servers 110B/1-3, 110B/2-2
    Replication Target at Site A: virtual servers 110A/1-2, 110A/2-2
VPG3 (Shown with Horizontal Hatching)
    Source at Site A: virtual server 110A/3-3
    Replication Target at Site B: virtual serer 110B/2-3
    Replication Target at Site C: virtual server 110C/1-4
VPG4 (Shown with Vertical Hatching)
    Source at Site A: virtual servers 110A/1-3, 110A/2-3, 110A/3-2
    Replication Target at Site C: virtual servers 110C/1-1, 110C/1-2, 110C/1-3

As such, it will be appreciated by those skilled in the art that the hypervisor architecture of FIG. 2 scales to multiple host sites, each of which hosts multiple hypervisors. The scaling flexibly allows for different numbers of hypervisors at different sites, and different numbers of virtual services and virtual disks within different hypervisors.

The scaling flexibility of the present invention also allows extension to cloud-based data services provided by a cloud provider on a shared infrastructure, as explained hereinbelow.

Cloud-based data services enable data center providers to service multiple enterprises at data centers that are remote from the enterprises. Cloud-based data services offer many advantages. Enterprises that use cloud-based data services obviate the needs for servers, SAN/NAS, networks, communication lines, installation, configuration and ongoing maintenance of information technology systems, and overhead expenses for electricity, cooling and space. However, conventional cloud-based data suffer from weakness of security due to multiple enterprises sharing the same physical infrastructure, and due to multiple enterprises using the same networks and IPs for their services.

Figure 9:
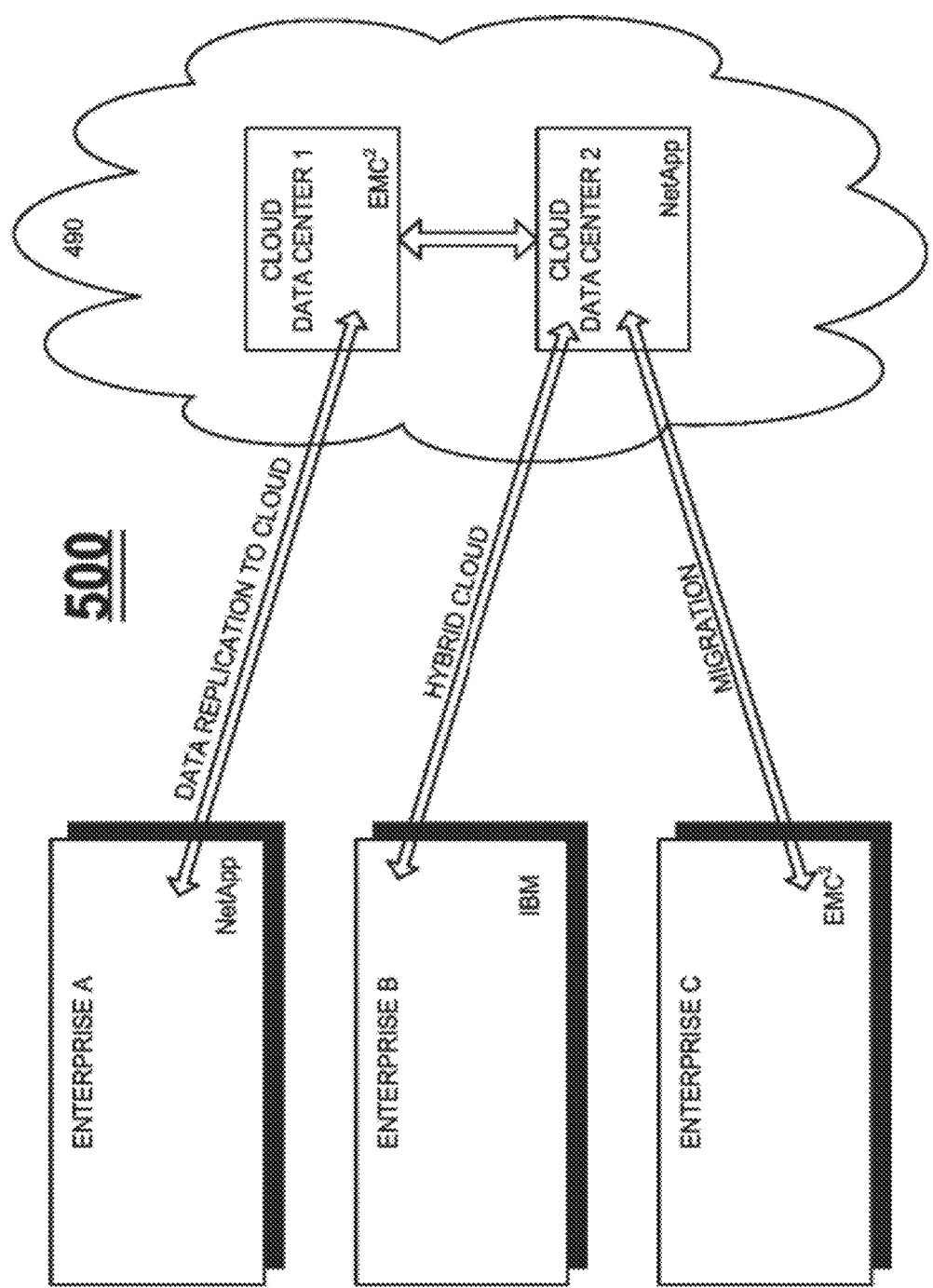
FIG. 9 is a simplified block diagram of a system for multi-tenant and multi-site cloud-based data services, in accordance with an embodiment of the present invention.

Cloud-based systems of the present invention overcome these weaknesses. Reference is made to FIG. 9, which is a simplified block diagram of a system 500 for mufti-tenant and mufti-site cloud-based data services, in accordance with an embodiment of the present invention. Shown in FIG. 9 are three enterprises, designated A, B and C, and a remote cloud-based facility 490 with two data centers, designated 1 and 2. Enterprise A uses a NETAPP® data management system, Enterprise B uses an IBM® data management system, and Enterprise C uses an EMC$^2$® data management system. Data Center 1 uses an EMC$^2$® data management system and services Enterprise A. Data Center 2 uses a NETAPP® data management system and services Enterprises B and C.

System 500 has many advantages over conventional data service systems. Inter alia, system 500 enables protection of heterogenic environments, enables remote control of enterprise sites, enables economies of scale, enables complete workload mobility, enables a complete web services API for seamless integration, and enables integration with other cloud-based management systems.

Figure 10:
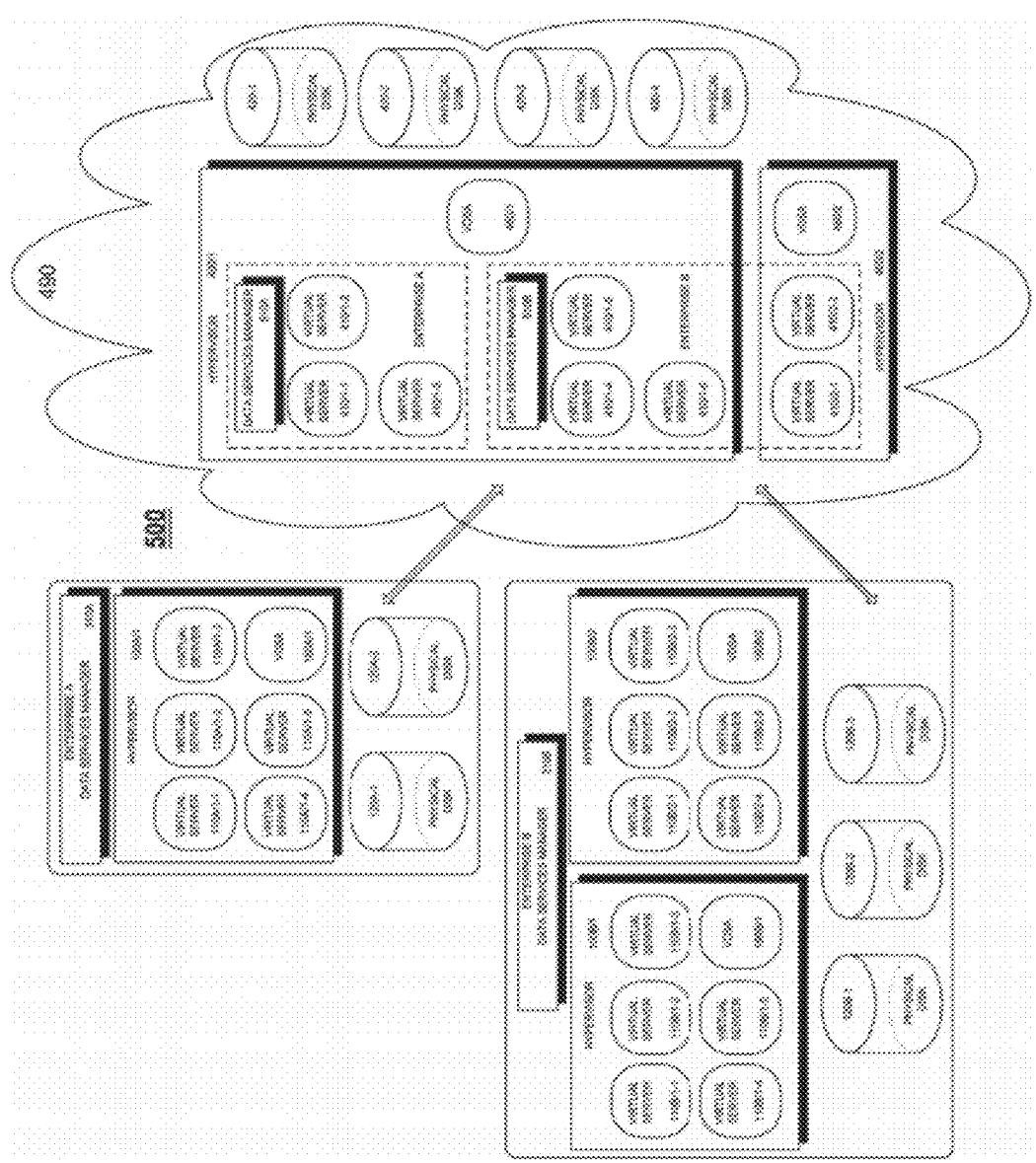
FIG. 10 is a simplified block diagram of a first architecture for providing hypervisor level mufti-tenant cloud-based data services, in accordance with an embodiment of the present invention.

Reference is made to FIG. 10, which is a simplified block diagram of a first architecture of system 500 for providing hypervisor level mufti-tenant cloud-based data services, in accordance with an embodiment of the present invention. The architecture shown in FIG. 10 includes two enterprises; namely, a smaller enterprise A and a larger enterprise B. Enterprise A infrastructure includes a single hypervisor 100A/1 with five virtual servers 100A/1-1, 100A/1-2, 100A/1-3, 100A/1-4 and 100A/1-5 and a VDSA 160A/1, includes two physical disks 120A-1 and 120A-2, and includes a data services manager 310A. Enterprise B infrastructure includes two hypervisors 100B/1 and 100B/2, includes three physical disks 120B-1, 120B-2 and 120B-3, and a data services manager 310B. Hypervisor 100B/1 includes five virtual servers 100B/1-1, 100B/1-2, 100B/1-3, 100B/1-4 and 100B/1-5 and a VDSA 160B/1; and hypervisor 100B/2 includes five virtual servers 100B/2-1, 100B/2-2, 100B/2-3, 100B/2-4 and 100B/2-5 and a VDSA 160B/2.

Cloud-based facility 490 infrastructure includes two hypervisors 400/1 and 400/2, and four physical disks 420-1, 420-2, 420-3 and 420-4. Hypervisor 400/1 includes six virtual servers 410/1-1, 410/1-2, 410/1-3, 410/1-4, 410/1-5 and 410/1-6; and hypervisor 400/2 includes two virtual servers 410/2-1 and 410/2-2. Hypervisor 400/1 services Enterprises A and B, and hypervisor 400/2 services Enterprise B. As such, the infrastructure of cloud-based facility 490 is shared between Enterprises A and B.

The architecture of FIG. 10 allocates one data services manager per enterprise and one VDSA per hypervisor. Specifically, hypervisor 400/1 includes a VDSA 460/1 and hypervisor 400/2 includes a VDSA 460/2. A data services manager 510A services Enterprise A, and a data services manager 510B services Enterprise B.

Figure 11:
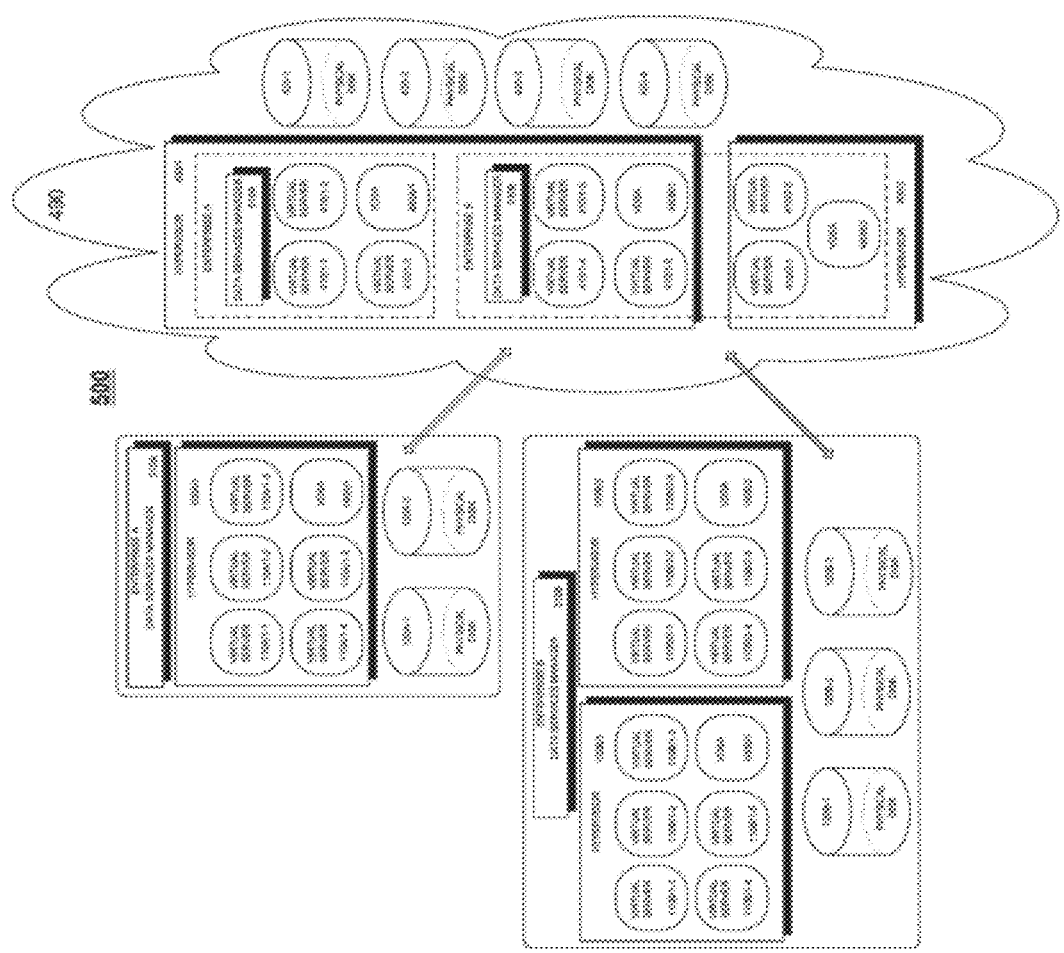
FIG. 11 is a simplified block diagram of a second architecture for providing hypervisor level mufti-tenant cloud-based data services, in accordance with an embodiment of the present invention.

Reference is made to FIG. 11, which is a simplified block diagram of a second architecture of system 500 for providing hypervisor level mufti-tenant cloud-based data services, in accordance with an embodiment of the present invention. The architecture of FIG. 11 allocates one data services manager per enterprise and one VDSA per enterprise per hypervisor. Specifically, hypervisor 400/1 includes a VDSA 460A/1 for Enterprise A and a VDSA 460B/1 for Enterprise B, and hypervisor 400/2 includes a VDSA 460B/2 for Enterprise B.

Figure 12:
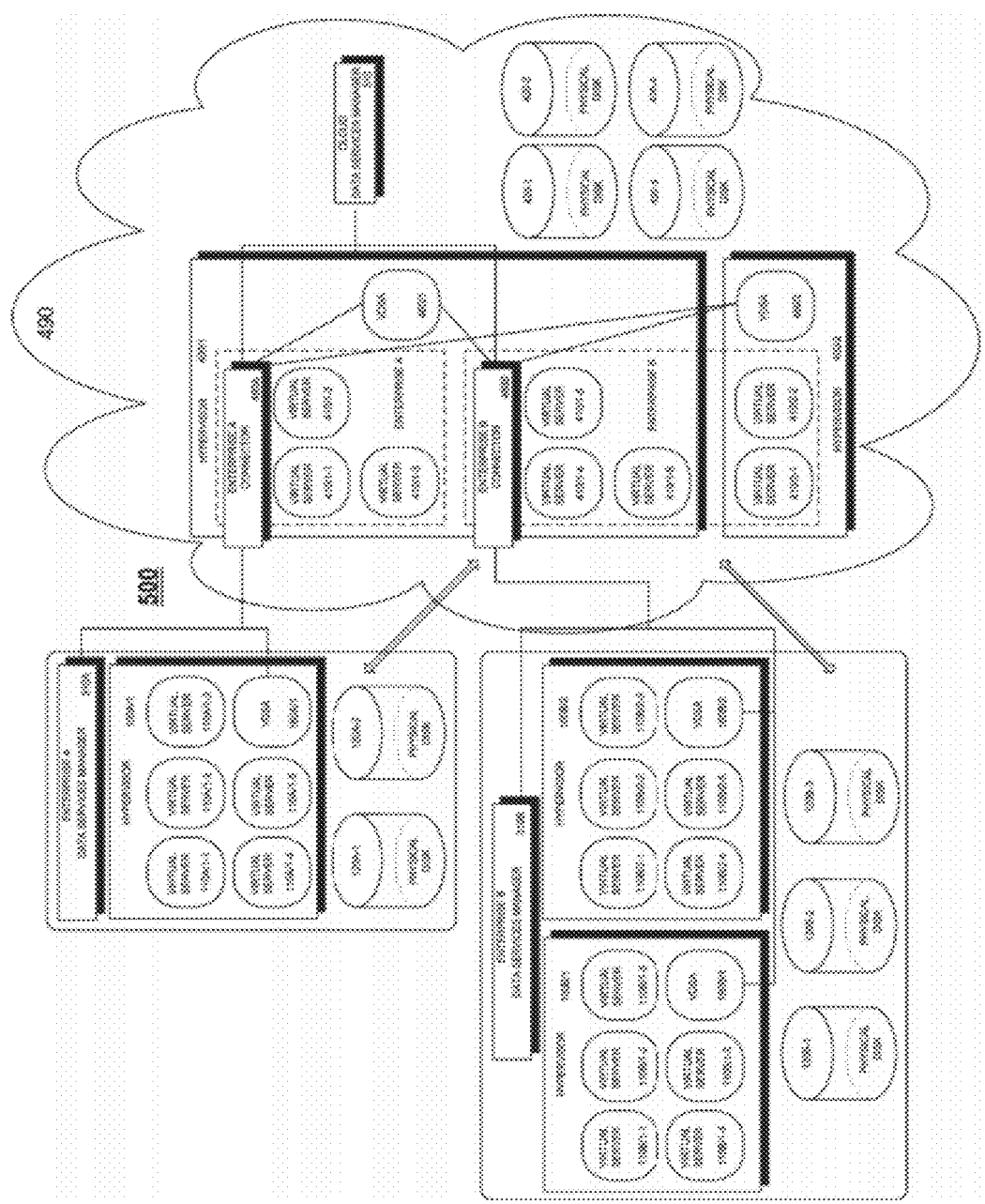
FIG. 12 is a simplified block diagram of a third architecture for providing hypervisor level mufti-tenant cloud-based data services, in accordance with an embodiment of the present invention.

Reference is made to FIG. 12, which is a simplified block diagram of a third architecture of system 500 for providing hypervisor level mufti-tenant cloud-based data services, in accordance with an embodiment of the present invention. The architecture of FIG. 12 allocates one data services manager in the cloud, and one VDSA per hypervisor. In addition, one enterprise connector is allocated per enterprise. Specifically, a connector 480A is allocated to Enterprise A, and a connector 480B is allocated to Enterprise B. Connector 480A is connected to both VDSA 460/1 and VDSA 460/2 and to a cloud data services manager 510 on the cloud side, and is connected to Enterprise A data services manager 310A and VDSA 160A/1 on the enterprise side. Similarly, connector 480B is connected to VDSA 460/1, VDSA 460/2 and cloud data services manager 510 on the cloud side, and is connected to Enterprise B data services manager 310B, VDSA 160B/1 and VDSA 160B/2 on the enterprise side. As such, each enterprise is connected to the entire infrastructure on the cloud side via its own connector.

Figure 13:
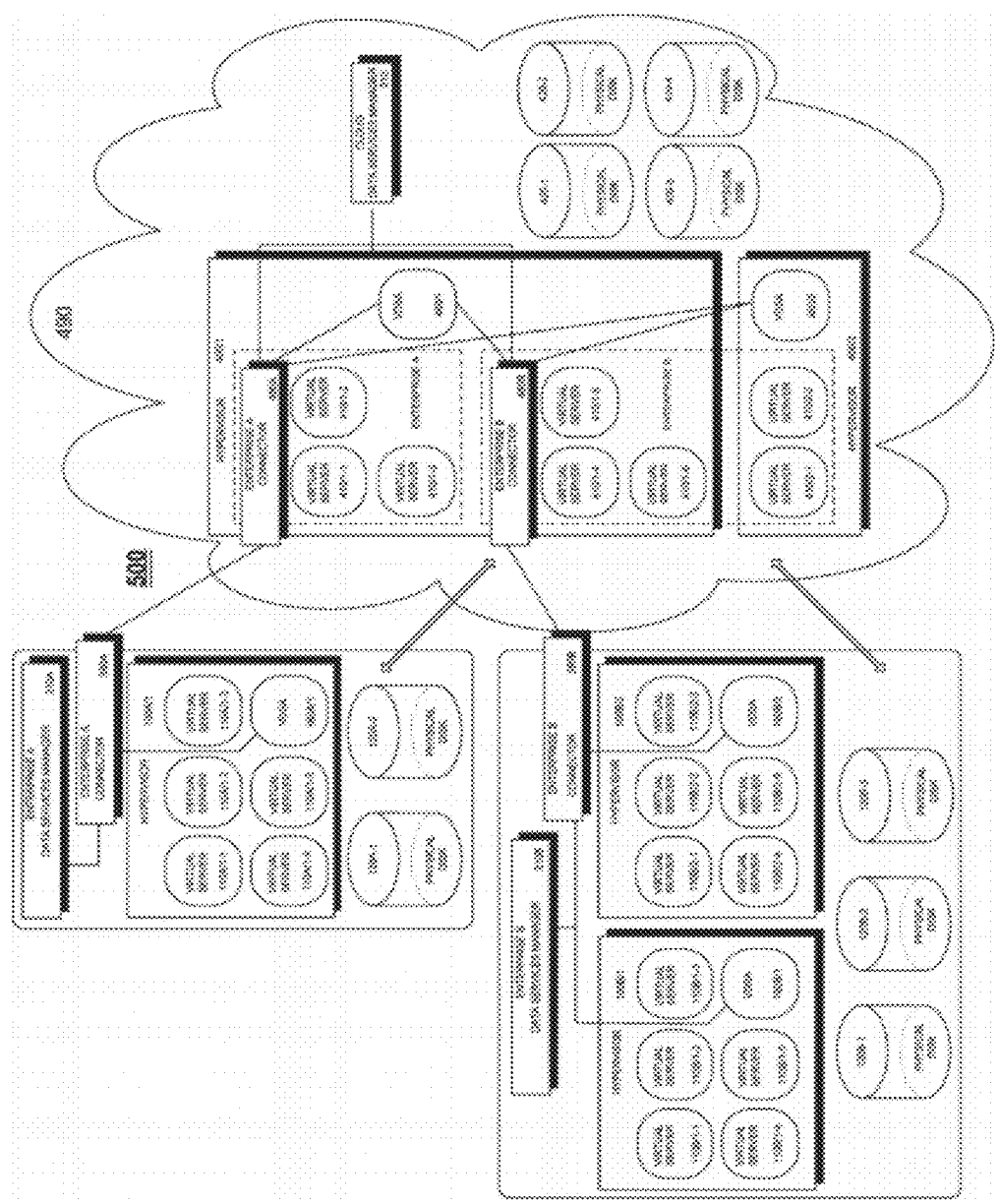
FIG. 13 is a simplified block diagram of a fourth architecture for providing hypervisor level mufti-tenant cloud-based data services, in accordance with an embodiment of the present invention.

Reference is made to FIG. 13, which is a simplified block diagram of a fourth architecture of system 500 for providing hypervisor level mufti-tenant cloud-based data services, in accordance with an embodiment of the present invention. The architecture of FIG. 13 also allocates one data services manager in the cloud, and one VDSA per hypervisor. In addition, one enterprise connector is allocated per enterprise. Connectors 480A and 480B on the cloud side are paired with respective connectors 380A and 380B on the enterprise side. Use of connectors 380A and 380B eliminates the need for a virtual private network (VPN), and enables installation of system 500 behind network address translators (NATs).

The different architectures in FIGS. 10-13 offer different advantages. The architecture of FIG. 10 minimizes the cloud footprint of the VDSA, by using a shared VDSA per hypervisor, and only one data services manager per enterprise. Specifically, the VDSA is shared between enterprises and security is enforced via the data services managers. In this architecture, the data services manager is duplicated per enterprise and centralized cloud management is lacking.

The architecture of FIG. 11 maximizes data path security for enterprises, but the cloud footprint is larger, since multiple data services managers may be required per hypervisor.

The architectures of FIGS. 12 and 13 provides data security, network security, minimal cloud footprint, and single point of control for cloud vendors. In this architecture, there is only one centralized data service manager on the cloud side, and only one VDSA per hypervisor. One cloud connector element is deployed on the cloud side, per enterprise. The cloud connector securely routes enterprise traffic from the enterprise network to the cloud infrastructure replication network, thus providing full network security and deployment features, including inter alia duplicate IP range utilization for different enterprises while maintaining unique network deployment on the cloud infrastructure side. The data services manager and VDSA's perform secure site authentication and data security, for end-to-end secure multi-tenant service.

As such, it will be appreciated by those skilled in the art that the cloud-based hypervisor level data services systems of the present invention enable multi-tenancy and multi-site services. I.e., multiple enterprises and multiple sites may be serviced by the same physical infrastructure including inter alia the same hypervisors and storage, with minimized footprint on the cloud side, allowing for centralized cloud management. By providing each enterprise with its own data services manager on the clod side, as in FIGS. 10 and 11, or alternatively with its own connector and a centralized data services manager on the cloud side, as in FIGS. 12 and 13, the systems of the present invention provide path separation between enterprises, thus ensuring that each enterprise is only able to view and access his own virtual servers and storage, and each enterprise can only control its own data replication.

By deploying additional cloud connectors on the enterprise side, as in FIG. 13, the systems of the present invention may be installed behind NATs, and do not require a VPN. As such, these systems may obviate VPN setups for enterprises, and obviate use of dedicated public IPs. For additional security, the cloud connectors encrypt traffic, thus eliminating the need for additional network security elements.

The systems of the present invention provide bi-directional cloud-based data replication services; i.e., from an enterprise to the cloud, and from the cloud to an enterprise, for the same enterprise or for different enterprises, simultaneously using the same shared infrastructure. Moreover, replication targets may be set as resources that do not expose the enterprise infrastructure, thus providing an additional layer of security and privacy between enterprises.

It will be appreciated by those skilled in the art that systems of the present invention may be used to enforce jurisdictional data export regulations. Specifically, cloud-based facility 490 infrastructure is partitioned according to jurisdictions, and data recovery and failover for an enterprise is limited to one or more specific partitions according to jurisdictional regulations.

Figure 14:
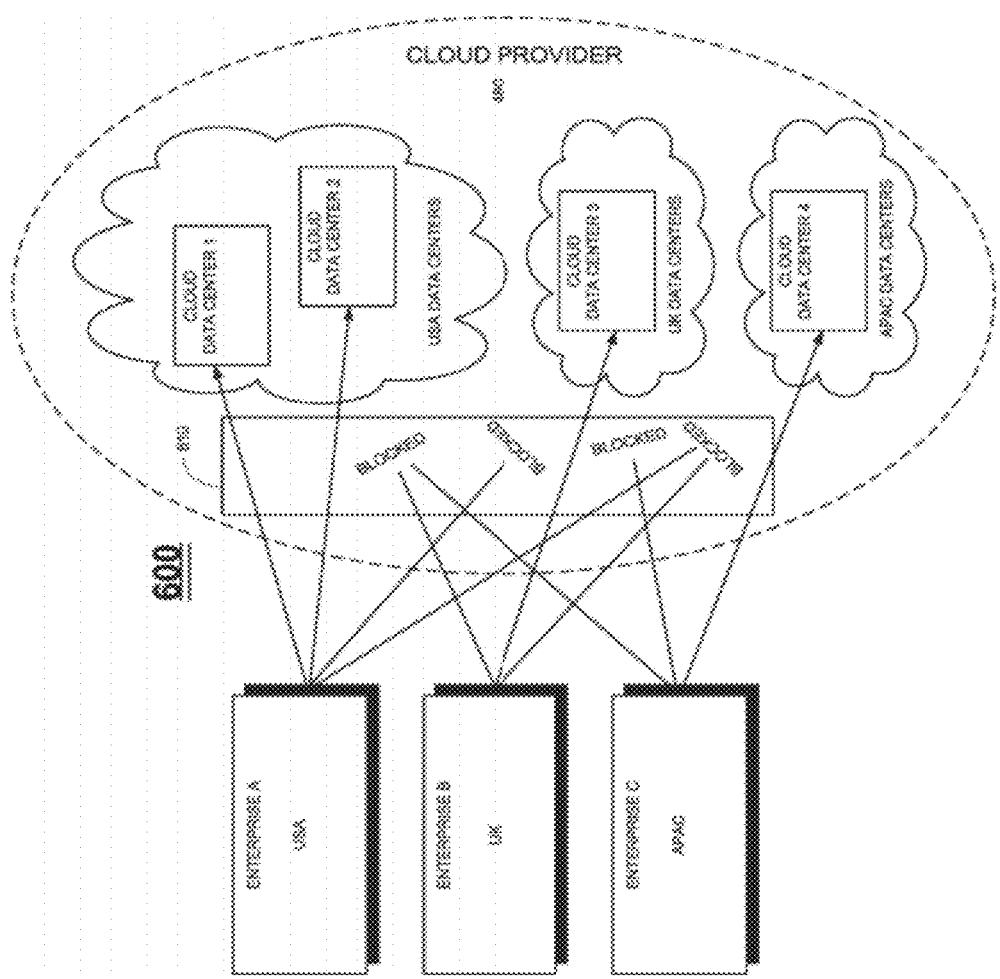
FIG. 14 is a simplified block diagram of a system for multi-tenant and mufti-site cloud-based data services with jurisdictional data separation, in accordance with an embodiment of the present invention.

Reference is made to FIG. 14, which is a simplified block diagram of a system 600 for mufti-tenant and mufti-site cloud-based data services with jurisdictional data separation, in accordance with an embodiment of the present invention. Shown in FIG. 14 are three jurisdictional enterprises; namely, a USA Enterprise A, a UK Enterprise B, and an APAC Enterprise C. Also shown in FIG. 14 are four data centers; namely, Data Center 1 and Data Center 2 in the USA, Data Center 3 in the UK and Data Center 4 in APAC.

Privacy and data security regulations prevent data from being exported from one jurisdiction to another. In order to enforce these regulations, system 600 includes a rights manager 610 that blocks access to a data center by an enterprise if data export is regulations restrict data transfer between their respective jurisdictions. Thus rights manager 610 blocks access by Enterprise A to Data Centers 3 and 4, blocks access by Enterprise B to Data Centers 1,2 and 4, and blocks access by Enterprise C to Data Centers 1, 2, and 3. Enterprises A, B and C may be commonly owned, but access of the data centers by the enterprises is nevertheless blocked, in order to comply with data export regulations.

In accordance with an embodiment of the present invention, when configuring a virtual protection group, an administrator may set a territory/data center restriction. When the administrator subsequently selects a destination resource for data replication for a virtual protection group, system 600 verifies that the resource is located in a geography that does not violate a territory/data center restriction.

The present invention may be implemented through an application programming interface (API), exposed as web service operations. Reference is made to Appendices I-V, which define an API for virtual replication web services, in accordance with an embodiment of the present invention.

It will thus be appreciated that the present invention provides many advantages, including inter alia:
heterogeneous hypervisor replication, for different types of sources and target hypervisor; e.g., from a VMWARE® hypervisor to a XEN® hypervisor;
heterogeneous storage replication, for different types of storage systems; e.g., from an EMC® storage system to a NETAPP® storage systems;
bi-directional replication, whereby one enterprise may replicate from the enterprise to a cloud data center, while another enterprise simultaneously replicates from a cloud data center back to the enterprise; and
security, whereby the cloud infrastructure is not exposed.

Aspects of the present invention provide disaster recovery systems with calendar-based, or date and time-based, RPO objectives and bandwidth allocations, thereby achieving greater flexibility and cost effectiveness vis-à-vis conventional single-RPO systems.

Using the present invention, a disaster recovery system may share a link between sites for replication and applications, and effectively cope with varying application change rates. The disaster recovery system may set a higher RPO objective during peak times and a lower RPO objective during off-peal times, limit data replication bandwidth during peak times, and relax data replication bandwidth during off-peak times. The disaster recovery system may use the different RPO objectives to advantage for allowing as much bandwidth as possible for production, taking into account that a higher RPO objective is met during peak times, while catching up afterwards during off-peak times when the RPO objective is lower.

Conversely, the disaster recovery system may set a lower RPO objective during peak times and a higher RPO objective during off-peak times, to enable sharing the link with other systems during off-peak times.

In accordance with an embodiment of the present invention, a control element is installed, to control bandwidth at a site level, protection group level. The control element monitors RPO objective in accordance with a calendar-based, or a date and time-based schedule.

In accordance with an embodiment of the present invention, a disaster recovery system may set different limits for data seeding traffics vs. data replication traffic over a WAN.

Figure 15:
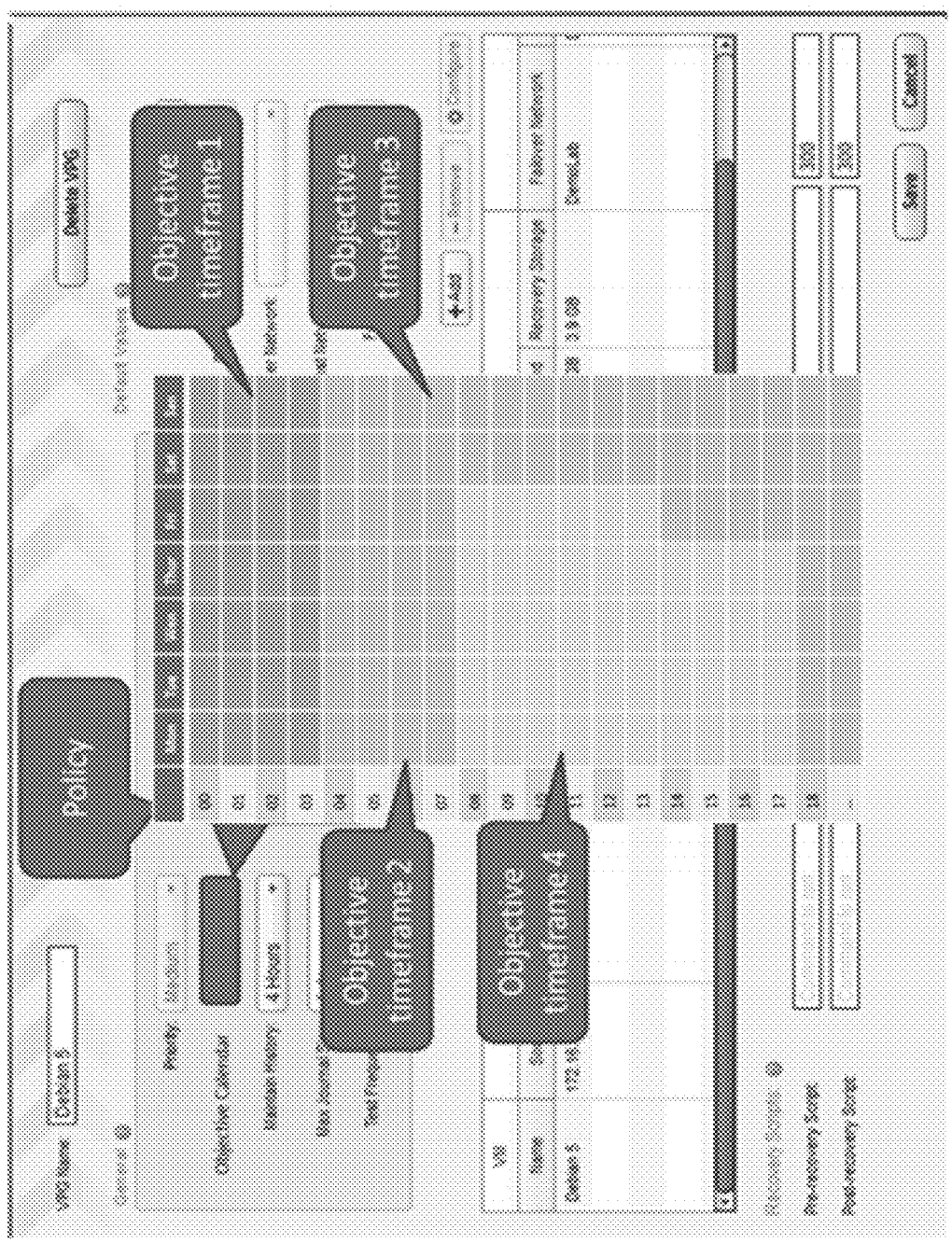
FIG. 15 is a screen shot of a mufti-RPO console for a disaster recovery application, in accordance with an embodiment of the present invention.

Reference is made to FIG. 15, which is a screen shot of a multi-RPO console for a disaster recovery application, in accordance with an embodiment of the present invention. The data recovery policy shown in FIG. 15 designates four timeframes, each timeframe having its own RPO objective and bandwidth limitation. The timeframes are scheduled using a weekly calendar. Timeframe 1 corresponds to 12:00 AM-4:00 AM, Mon.-Sun. Timeframe 2 corresponds to 4:00 AM-8:00 AM, Mon.-Thurs. Timeframe 4 corresponds to 8:00 AM-2:00 PM, Mon.-Fri. and 2:00 PM-6:00 PM, Mon.-Thurs. Timeframe 3 corresponds to the remainder of the week.

Figure 16:
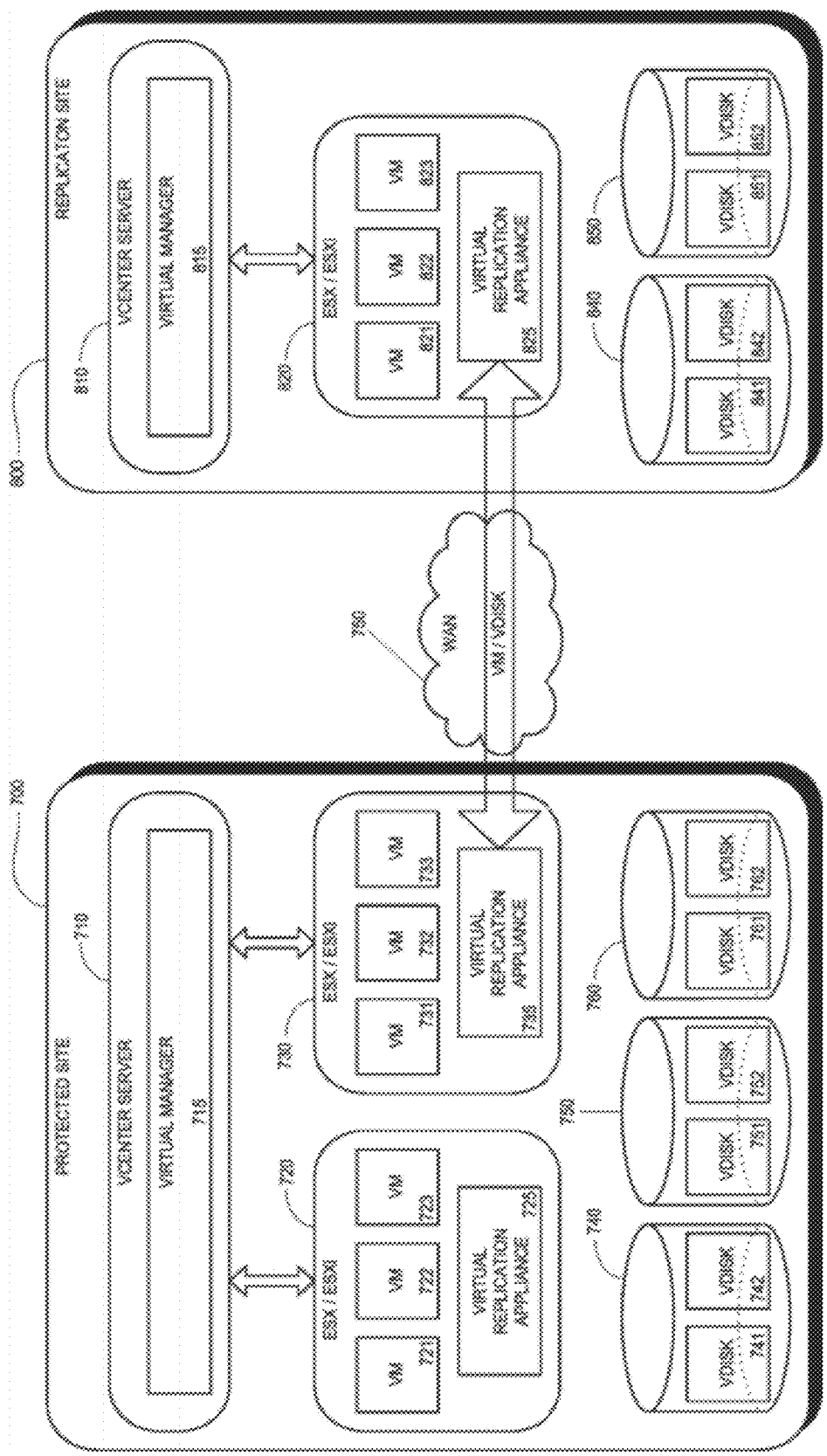
FIG. 16 is a simplified block diagram of an exemplary mufti-RPO data protection system, in accordance with an embodiment of the present invention.

Reference is made to FIG. 16, which is a simplified block diagram of an exemplary multi-RPO data protection system, in accordance with an embodiment of the present invention. Shown in FIG. 16 are a protected site 700 and a replication site 800. Protected site 700 includes a vCenter server 710, ESX/ESXi hypervisors 720 and 730, and physical disks 740, 750 and 760. Server 710 includes a virtual manager 715. Hypervisor 720 includes virtual machines 721,722 and 723, and hypervisor 730 includes virtual machines 731, 732 and 733. Hypervisors 720 and 730 also include respective virtual replication appliances 725 and 735. Physical disk 740 includes virtual disks 741 and 742, physical disk 750 includes virtual disks 751 and 752, and physical disk 760 includes virtual disks 761 and 762. Physical disks 740, 750 and 760 may be heterogeneous; e.g., physical disk 740 may be a NETAPP® disk, physical disk 750 may be an IBM® disk, and physical disk 760 may be an EMC²® disk.

Replication site 800 includes a vCenter server 810, an ESX/ESXi hypervisor 820, and physical disks 840 and 850. Server 810 includes a virtual manager 815. Hypervisor 820 includes virtual machines 821, 822 and 823. Hypervisor 820 also includes a virtual replication appliance 825. Physical disk 840 includes virtual disks 841 and 842, and physical disk 850 includes virtual disks 851 and 852. Physical disks 840 and 850 may be heterogeneous; e.g., physical disk 840 may be a NETAPP® disk, and physical disk 850 may be an EMC²® disk.

Figure 17:
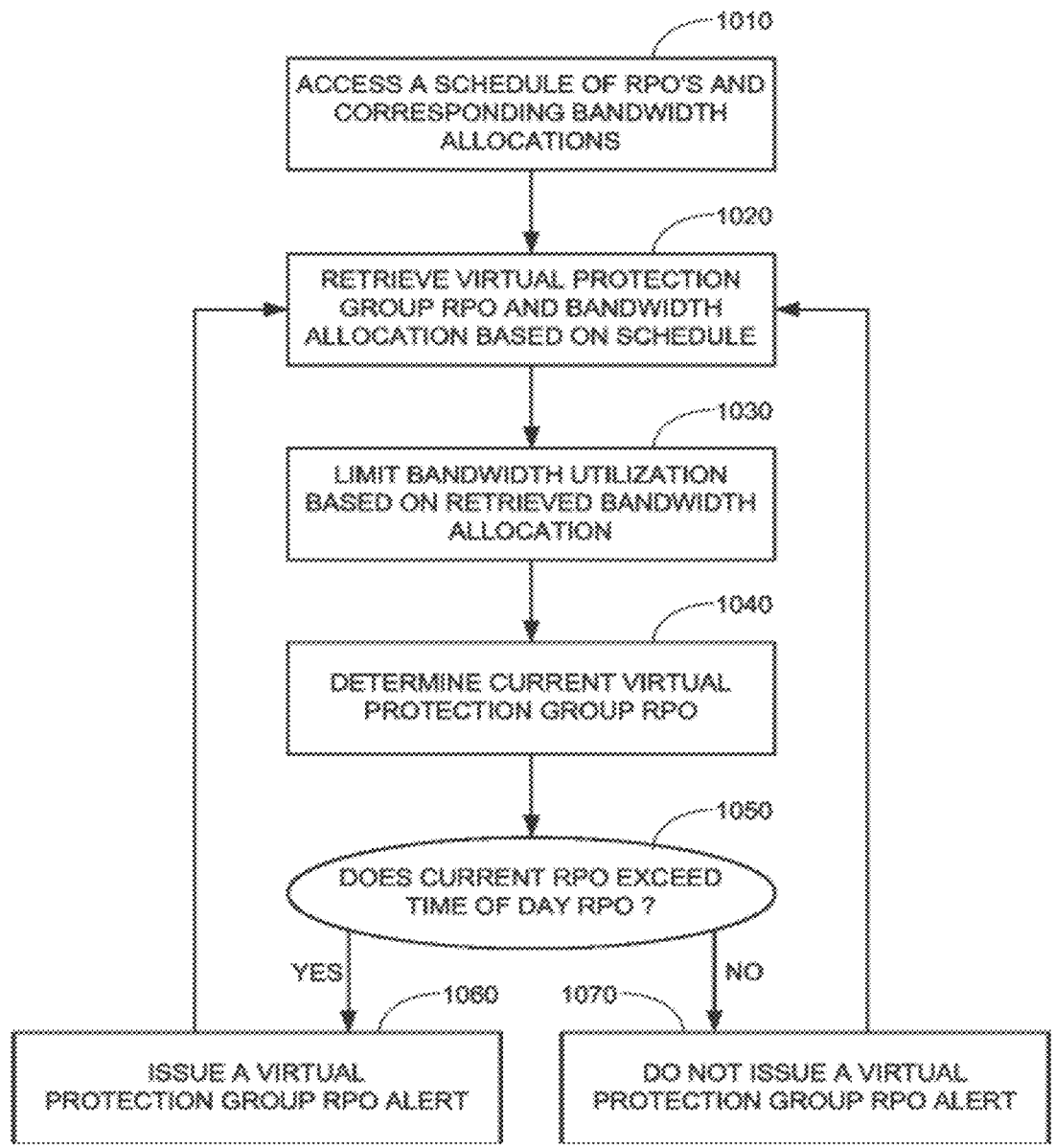
FIG. 17 is a simplified flow diagram of a method for multi-RPO data protection, in accordance with an embodiment of the present invention.

Reference is made to FIG. 17, which is a simplified flow diagram of a method for multi-RPO data protection, in accordance with an embodiment of the present invention. At operation 1010 virtual manager 715 accesses a calendar-based schedule of RPO objectives and corresponding bandwidth allocations. At operation 1020 virtual manager 715 retrieves the designated RPO for a virtual protection group and the designated bandwidth allocation, for a given date and time, in accordance with the schedule. At operation 1030 virtual manager 715 limits bandwidth usage of a disaster recovery system for replicating data for the virtual protection group, based on the retrieved designated bandwidth allocation. At operation 1040 virtual manager 715 determines the current RPO for the virtual protection group.

At operation 1050 virtual manager 715 determines whether or not the current RPO, determined at operation 1040, exceeds the designated RPO retrieved at operation 1020. If so, then at operation 1060 virtual manager 715 issues a virtual protection group RPO alert. Otherwise, at operation 1070, virtual manager 715 turns off the virtual protection group RPO alert.

In an embodiment of the present invention, virtual manager 715 is operative to adjust the schedule of RPO objectives and corresponding bandwidth allocations in response to having issued multiple RPO alerts at operation 1060.

An RPO alert is a notification to an operator, generally indicating a data replication write rate that is too high relative to a bandwidth constraint, which in turn means that there is a service level agreement issue or risk to be addressed. For conventional disaster recovery systems, because of the difference between peak and off-peak data write demands, some RPO alerts are expected, and represent warnings that can be ignored, and other RPO alerts are not expected and represent serious concerns—which is generally confusing to the operator.

By using the present invention to schedule RPO objectives in accordance with peak and off-peak write demand times, ignorable RPO alerts are avoided, and the operator knows that the RPO alerts that are issued represent serious concerns that need to be addressed.

In the foregoing specification, the invention has been described with reference to specific exemplary embodiments thereof. It will, however, be evident that various modifications and changes may be made to the specific exemplary embodiments without departing from the broader spirit and scope of the invention as set forth in the appended claims. Accordingly, the specification and drawings are to be regarded in an illustrative rather than a restrictive sense.

APPENDIX I

Site Controller Web Services

These web services include methods and properties for pairing and un-pairing sites, and for managing site details.
Properties
  PeerSiteIdentifier
  This property is a globally unique identifier for the peer site of a given site.
  SiteConnectionParameters
  This property includes parameters to access a site, including
    string Hostname—the host name or IP address of the site; and
    int Port—the port for the virtual data services appliances at the site.
  SiteIdentifier
  This property is a globally unique identifier for a site.
  SiteManagementDetails
  This property includes a name, location and contact information for a site, including
    string ContactInfo—the information used to contact an administrator in case recovery is required;
    string Location—the location of the site; and
    string SiteName—the name of the site.
  ThisSiteIdentifier
  This property indicates the globally unique identifier for the local site.

Methods
  GetPeerConnectionParameters
  public SiteConnectionParameters Get PeerConnectionParameters( )
  This method retrieves the IP address and port of the site paired with a given site.
  GetSiteDetails
  public SiteDetails GetSiteDetails(SiteIdentifier siteIdentifier)
  This method retrieves site details, including inter alia the IP address and port of a designated server.
  GetSiteManagementDetails
  public SiteManagementDetails GetSiteManagementDetails (SiteIdentifier siteIdentifier)
  This method retrieves the name, location and contact information specified by an administrator for a designated site.
  GetSiteMappings
  public IEnumerable<SiteMapping> GetSiteMappings( )
  This method retrieves the identifiers for a site and for its paired site.
  Get TcpPort
  public int GetTcpPort(SiteIdentifier siteIdentifier)
  This method retrieves the TCP port to access the virtual data services application for a designated site.
  GetUsername
  public string GetUsername( )
  This method retrieves the username for a hypervisor.
  GetIP
  public string GetIP( )
  This method retrieves the IP address or a hostname for a hypervisor.
  IsPaired
  public bool IsPaired( )
  This method returns true if the local site is paired with another site. Otherwise, it returns false.
  Pair
  public void Pair(SiteConnectionParameters peerConnectionParameters)
  This method pairs a local site with another site.
  Reconfigure
  public void Reconfigure(String hostname, String username, String password)
  This method reconfigures hypervisor information.
  SetTcpPort
  public int SetTcpPort (SiteIdentifier siteIdentifier, int port)
  This method sets the TCP port used to access the virtual data services appliances at a designated site.
  Unpair
  public void Unpair ( )
  This method un-pairs a local and remote site.

APPENDIX II

Host Controller Web Services

These web services include methods and properties to identify hypervisors, and to deploy virtual data services appliances on hypervisors.
Properties
  HostIdentifier
  This property identifies a hypervisor, and includes
    string InternalHostName—a name used to identify the hypervisor; and
    ServerIdentifier serverIdentifier—the globally unique identifier for the hypervisor.

Methods
　GetCurrentlyInstallingHosts
public HostIdentifier GetCurrentlyInstallingHosts(SiteIdentifier siteIdentifier)
　This method retrieves a list of hypervisors where a virtual data services appliance is in the process of being installed, at a designated site.
　GetCurrentlyRemovingHosts
public HostIdentifier GetCurrentlyRemovingHosts(SiteIdentifier siteIdentifier)
　This method retrieves a list of hypervisors where a virtual data services appliance is in the process of being un-deployed, at a designated site.
　GetInstalledHosts
public HostIdentifier GetInstalledHosts(SiteIdentifier siteIdentifier)
　This method retrieves a list of hypervisors where a virtual data services appliance is installed, at a designated site.
　GetUninstalledHosts
public HostIdentifier GetUninstalledHosts( SiteIdentifier siteIdentifier)
　This method retrieves a list of hypervisors where a virtual data services appliance is not installed, at a designated site.
　InstallVdsaOnHost
public CommandTaskIdentifier InstallVdsaOnHost(SiteIdentifier siteIdentifier, HostIdentifier hostIdentifier, DatastoreIdentifier datastoreIdentifier, NetworkIdentifier networkIdentifier, VdsaIpConf vdsaIpConf)
　This method deploys a virtual data services appliance on a specified hypervisor at a designated site, in accordance with a specified datastore, a specified type of network, and access details including inter alia an IP a subnet mask and gateway for the VDSA.
　UninstallVdsaFromHost
public void UninstallVdsaFromHost(SiteIdentifier siteIdentifier, HostIdentifier hostIdentifier)
　This method un-deploys a virtual data services appliance from a specified hypervisor, at a designated site.

APPENDIX III

Protection Group Controller Web Services
　These web services include methods and properties to manage virtual protection groups.
Properties
　Checkpoint
　This property identifies a checkpoint by an unsigned integer.
　FailoverTestInfo
　This property includes information returned from a failover test, including
　　DateTime StartTime—The time the test started, represented as a date and time of day;
　　DateTime EndTime—The time the test ended, represented as a date and time of day;
　　TestStatus Status—A status of the test, including Unknown, FailedBySystem, AbortedByFailoverCommand, AbortedBySystem, FailedByUser, Success, CurrentlyRunning;
　　string Summary—a summary of the test;
　　string AttachmentName—a name of an attachment; and
　　byte [ ] Attachment—a key to an attachment.
　ProtectionGroupIdentifier
　This property is a globally unique identifier for a virtual protection group.
　ProtectionGroupManagementSettings
　This property defines settings for a protection group, including
　　ProtectionGroupSettings—properties for a protection group;
　　vAppManagementSettings—properties for a virtual application, when the virtual protection group protects a virtual application; and
　　VSManagementSettings—properties for the virtual server.
　ProtectionGroupSettings
　This property defines settings for a virtual protection group, including
　　string Name—a name used to identify the virtual protection group;
　　unsigned int RpoInSeconds—the maximum number of seconds between checkpoints;
　　unsigned long LogVolumeMaxSizeInSectors—the maximum log size;
　　unsigned int LogBacklogInMinutes—the time during which log entries are kept in cache;
　　bool UseCompression—set to true if data should be compressed when transmitted to the peer site;
　　ProtectionGroupDefaults Defaults—defaults used to identify the recovery site, including the IP address of the hypervisor host, the name of the datastore, and the networks to use for tests and for failovers
　　ProtectionGroupPriority Priority—the priority assigned to the virtual protection group; namely, Low, Medium or High;
　　int RemoteId—the identifier assigned to the peer site; and
　　int MaxTestIntervalInMinutes—the maximum time, in minutes, between tests.
　ProtectionGroupStatus
　This property indicates the status of a virtual protection group, from among Protecting, NeedReverseConfiguration, Promoting, PromotingAndNeedReverseConfiguration, Test, Failover, PromotionCompleteMirrorsNotYetActivated, MissingConfiguration, PromotingAndMissingConfiguration, RemoveInProgress.
　vAppManagementSettings
　This property indicates settings for a virtual application, including
　　vAppIdentifier
　　　string InternalVAppName—a name for the virtual application; and
　　　ServerIdentifier serverIdentifier—a globally unique identifier for the virtual application; and
　　vAppSettings
　　　string InternalName—a name of the virtual application replication destination;
　　　ServerIdentifier serverIdentifier—a globally unique identifier for the virtual application replication destination; and
　　　Type—the type of server hosting the virtual application at the destination; namely, host(0) or cluster(1).
　VSManagementSettings
　This property indicates settings for a virtual server, including
　　VSIdentifier
　　　string InternalVSName—a name given to the virtual server; and
　　　ServerIdentifier serverIdentifier—a globally unique identifier for the virtual server;

VSSettings
  ReplicationDestination—the destination name, identifier and type (host/cluster) and the datastore name and identifier; and
  VSDestinationFolders—a failover destination folder and a failover test destination folder, including a name and an identifier;
VNicManagementSettingsCollection—virtual NIC settings; and
VolumeManagementSettings—settings that identify a volume, such as the directory, path and name of the disk and type of disk, such as a raw drive, and whether or not it is a swap disk.

Methods
  bCheckpointsExist
public bool bCheckpointsExist(ProtectionGroupIdentifier identifier)
  This method returns true if checkpoints exit for a designated virtual protection group.
  ClearSite
public CommandTaskIdentifier ClearSite(SiteIdentifier site)
  This method removes the virtual protection groups defined at a designated site.
  CreateProtectionGroup
public CommandTaskIdentifier CreateProtectionGroup(ProtectionGroupManagementSettings managementSettings SiteIdentifier siteIdentifier)
  This method creates a virtual protection group at a designated site.
  FailOver
public CommandTaskIdentifier FailOver(ProtectionGroupIdentifier identifier, CheckpointIdentifier checkpoint, ProtectionGroupManagementSettings postFailoverSettings)
  This method performs a failover of the virtual servers in a designated virtual protection group, to a designated checkpoint instance or to the latest checkpoint.
  FailOverTest
public CommandTaskIdentifier FailOverTest(ProtectionGroupIdentifier identifier, CheckpointIdentifier checkpoint)
  This method performs a failover of the virtual servers in a designated virtual protection group, to a designated checkpoint or to the latest checkpoint, without creating reverse replication and without stopping protection of the virtual servers in the designated virtual protection group.
  ForceRemoveProtectionGroup
public CommandTaskIdentifier ForceRemoveProtectionGroup(ProtectionGroupIdentifier identifier)
  This method removes a virtual protection group irrespective of the state of the group. This method is used if the RemoveProtectionGroup method is unable to complete successfully.
  ForceUpdateProtectionGroup
public CommandTaskIdentifier ForceUpdateProtectionGroup(ProtectionGroupIdentifier identifier, ProtectionGroupManagementSettings managementSettings)
  This method updates virtual protection group settings, including removal of virtual servers and disks that should have been removed using the RemoveProtectionGroup method. This method is used if the UpdateProtectionGroup method is unable to complete successfully.
  GetCheckpointList
public List<Checkpoint> GetCheckpointList(ProtectionGroupIdentifier identifier)
  This method retrieves a list of checkpoints for a specified virtual protection group.
  GetFailOverTestInfo
public List<FailoverTestInfo> GetFailoverTestInfo(ProtectionGroupIdentifier identifier, int numOfTests)
  This method retrieves information about failover tests for a specified virtual protection group.
  GetProtectionGroupDefaultReverseSettings
public ProtectionGroupManagementSettings GetProtectionGroupDefaultReverseSettings(ProtectionGroupIdentifier identifier)
  This method retrieves the virtual protection group settings for a specified virtual protection group, for use as default values for reverse replication.
  GetProtectionGroupManagementSettings
public ProtectionGroupManagementSettings GetProtectionGroupManagementSettings(ProtectionGroupIdentifier identifier)
  This method retrieves the settings for a designated virtual protection group.
  GetProtectionGroups
public IEnumerable<ProtectionGroupIdentifiers> GetProtectionGroups( )
  This method retrieves a list of virtual protection groups.
  GetProtectionGroupState
public ProtectionGroupState GetProtectionGroupState(ProtectionGroupIdentifier identifier)
  This method retrieves the state of a specified virtual protection group, the state being "protected" or "recovered". If the group is protected, 0 is returned; and if the group is recovered, 1 is returned.
  GetProtectionGroupStatus
public ProtectionGroupStatus GetProtectionGroupStatus(ProtectionGroupIdentifier identifier)
  This method retrieves the status of a specified virtual protection group, the status being inter alia "protecting", "testing" or "promoting".
  InsertTaggedCheckpoint
public CommandTaskIdentifier InsertTaggedCheckpoint(ProtectionGroupIdentifier identifier, string tag)
  This method inserts a named checkpoint for a designated virtual protection group. The method returns immediately, without verifying whether or not the checkpoint was successfully written to the journal in the peer site.
  IsPairConnected
public bool IsPairConnected( )
  This method returns true if the connection to the paired site is up.
  Move
public ComamndTaskIdentifier Move(ProtectionGroupIdentifier identifier, ProtectionGroupManagementSettings postMoveSettings)
  This method migrates a specified virtual protection group to the peer site.
  ProtectVS
public CommandTaskIdentifier ProtectVS(ProtectionGroupIdentifier identifier, VSManagementSettings vsManagementSettings)
  This method adds a designated virtual server to a virtual protection group, in accordance with designated settings.
  RemoveProtectionGroup
public CommandTaskIdentifier RemoveProtectionGroup(ProtectionGroupIdentifier identifier)
  This method removes a virtual protection group, unless the group is being replicated during a test failover or an actual failover, and unless the group is being migrated to the peer site. If this method does not return a Success completion code, the ForceRemoveProtectionGroup method may be used to force removal of the group.

StopFailOverTest
public CommandTaskIdentifier StopFailOverTest(ProtectionGroupIdentifier identifier, FailoverTestInfo testInfo)
This method stops a failover test, and removes the test virtual servers from the peer site.
TrimOldFailoverTest
public void TrimOldFailoverTest(ProtectionGroupIdentifier identifier, int numOfOldTestsToTrim)
This method discards information about a specified number of old failover tests for a designated virtual protection group, from the oldest test to the most recent test.
UnprotectVS
public CommandTaskIdentifier UnprotectVS(ProtectionGroupIdentifier identifier, VSIdentifier vsIdentifier)
This method removes a designated virtual server from a designated virtual protection group.
UpdateProtectionGroup
public CommandTaskIdentifier UpdateProtectionGroup (ProtectionGroupIdentifier identifier, ProtectionGroupManagementSettings managementSettings)
This method updates settings of a specified virtual protection group. If the method does not return a Success completion code, the ForceUpdateProtectionGroup method can be used to force the update.
WaitForCheckpoint
public CommandTaskIdentifier WaitForCheckpoint(ProtectionGroupIdentifier identifier, Checkpoint checkpoint, int waitingIntervalInSeconds, int timeoutInSeconds)
This method waits for a checkpoint to be written to a journal on the peer site, after it was inserted, or times out if it takes too long.

APPENDIX IV

Command Tracker Web Services
These web services include methods and properties to monitor procedures being executed.
Properties
  CommandTaskInfoProperties
  This property includes.
  enum CommandType—valid methods;
  enum CompletionCode—the result of running a method, including NotAvailable, Success, Aborted, Failed and HadException;
  int OriginalInputParms—input parameters; and
  int PgId—the globally unique identifier for a virtual protection group.
Methods
  GetAllTasks
public List<CommandTaskIdentifier> GetAllTasks( )
This method retrieves a list of all tasks that are currently active.
  Get CompletionCode
public CommandTaskCompletionCode GetCompetionCode (CommandTaskIdentifier taskid)
This method returns the completion code of a specified task. Completion codes include Success, Aborted, Failed or HadException. If the task is still running, NotAvailable is returned.
  GetCommandTaskInfo
public CommandTaskInfo GetCommandTaskInfo(CommandTaskIdentifier cmdIdentifier)
This method returns the command type, the completion code input parameters, and the virtual protection group identifier of a designated task.

GetExceptionString
public string GetExceptionString(CommandTaskIdentifier taskId)
This method returns the string associated with an exception, for a designated task that had an exception. The method GetCompletionCode returns HadException if a task had an exception.
GetProgress
public int GetProgress (CommandTaskIdentifier taskid)
This method returns progress as a percentage of a whole task, as an integer, for a specified task.
GetProtectionGroupCommandTaskid
public CommandTaskIdentifier GetProtectionGroupCommandTaskId(ProtectionGroupIdentifier pgId)
This method returns the identifier of a task currently being performed on a designated protection group.
GetProtectionGroupCommandTaskidLocally
public CommandTaskIdentifier GetProtectionGroupCommandTaskIdLocally(ProtectionGroupIdentifier pgId)
This method returns the identifier of a task currently being performed on a specified protection group at a local site.
GetResult
public Object GetResult(CommandTaskIdentifier taskId)
This commend returns the result for a designated task. The returned result may be one of the following:
  the identifier of the virtual protection group identified by the task ID;
  the settings of the virtual protection group identified by the task ID;
  a checkpoint whose insertion is identified by the task ID; or
  the identifier of the log collection identified by the task ID.
GetStatus
public CommandTaskStatus GetStatus(CommandTaskIdentifier taskId)
This method retrieves the current status of a specified task. The status may be Active, Running, Aborted or Completed.
Wait
public void CommandTaskIdentifier Wait(ComamndTaskIdentifier taskId, int IntervalInMillis, int TimeOutInMillis)
This method waits for a specified task to complete, by polling the task at specified time intervals, until a specified time out.

APPENDIX V

Log Collector Web Services
These web services include methods and properties to retrieve information for troubleshooting.
Properties
  LogCollectionRequest
  This property indicates details of a log request, including a level of detail of information, indicating whether information about a virtual data service appliance and core information should be included, and including start and end times for the information.
Methods
  CollectSystemLogs
public CommandTaskIdentifier CollectSystemLogs(LogCollectionRequest request)
This method initiates a log request.
  RetrieveLogPackage
public Stream RetrieveLogPackage (LogCollectionIdentifier id)
This method retrieves results of a log request.

What is claimed is:

1. A system for disaster recovery, comprising:
a controller for a server having at least one processor, the controller having a virtual manager configured to cause the at least one processor to manage at least one hypervisor and to cause the at least one processor to:
(i) control bandwidth usage of a disaster recovery system in accordance with a plurality of recovery point objectives (RPOs), each of the plurality of RPOs designating a maximal time loss constraint for data recovery for an enterprise production system, wherein the enterprise production system includes a hypervisor system comprising multiple virtual protection groups, and a corresponding bandwidth allocation for the disaster recovery system to use in replicating data for the enterprise production system, wherein each of the plurality of RPOs are applied in accordance with a calendar-based schedule of dates and times, wherein multiple calendar-based schedules are used to schedule each of the RPOs and bandwidth allocations to control issuance of RPO alerts and the bandwidth usage for data replication for a corresponding virtual protection group of the enterprise production system, and
(ii) issue an RPO alert when the maximal time loss constraint for a current date and time for one of the plurality of RPOs is not satisfied when the maximal time loss constraint exceeds a bandwidth constraint.

2. The system of claim 1 wherein bandwidth is shared between the disaster recovery system and the enterprise production system, and wherein the bandwidth allocation for each RPO is an allocation of the shared bandwidth.

3. The system of claim 2, wherein the calendar-based schedule allocates more bandwidth to the disaster recovery system during off-peak production times for the enterprise production system, and allocates less bandwidth to the disaster recovery system during peak production times for the enterprise production system.

4. The system of claim 1 wherein said controller adjusts the calendar-based schedule in response to having issued multiple RPO alerts.

5. A method for disaster recovery, comprising:
accessing a calendar-based schedule of a plurality of recovery point objectives (RPOs) and corresponding bandwidth allocations for a disaster recovery system, each RPO of the plurality of RPOs designating a maximal time loss constraint for data recovery for an enterprise production system, wherein the enterprise production system includes a hypervisor system comprising multiple virtual protection groups, and each bandwidth allocation constraining bandwidth usage for replicating data for the enterprise production system, wherein multiple calendar-based schedules are used to schedule each of the RPOs and bandwidth allocations to control issuance of RPO alerts and the bandwidth usage for data replication for a corresponding virtual protection group of the enterprise production system;
retrieving, by the disaster recovery system at any given date and time, the recovery point objective (RPO) and the corresponding bandwidth allocation for the given date and time, from the calendar-based schedule;
limiting, by the disaster recovery system at the given date and time, bandwidth usage of the disaster recovery system in accordance with the retrieved bandwidth allocation;
determining, by the disaster recovery system, a current RPO; and
issuing, by the disaster recovery system, an RPO alert based on the current RPO exceeding the retrieved RPO.

6. The method of claim 5 wherein bandwidth is shared between the disaster recovery system and the enterprise production system, and wherein the bandwidth allocation for each RPO is an allocation of the shared bandwidth.

7. The method of claim 6, wherein the calendar-based schedule allocates more bandwidth to the disaster recovery system during off-peak production times for the enterprise production system, and allocates less bandwidth to the disaster recovery system during peak production times for the enterprise production system.

8. The method of claim 5 further comprising adjusting the calendar-based schedule in response to multiple occurrences of said issuing an RPO alert.

9. The system of claim 1, wherein the controller reduces a data replication rate for the enterprise production system during off-peak production times.

10. The system of claim 1, wherein the controller increases a data replication rate for the enterprise production system during peak production times.

11. The system of claim 1, wherein the controller reduces an RPO objective for the enterprise production system during off-peak production times.

12. The system of claim 1, wherein the controller increases an RPO objective for the enterprise production system during peak production times.

13. The system of claim 1, wherein the controller establishes at least four timeframes for a weekly calendar schedule, wherein each of the at least four timeframes has a unique RPO objective and bandwidth limit.

14. The system of claim 2, wherein the controller reduces an RPO objective for the enterprise production system during peak production times and increases an RPO objective for the enterprise production system during off-peak production times to enable the enterprise production system to share bandwidth with the disaster recovery system.

15. The method of claim 5, comprising:
reducing a data replication rate for the enterprise production system during off-peak production times.

16. The method of claim 5, comprising:
increasing a data replication rate for the enterprise production system during peak production times.

17. The method of claim 5, comprising:
reducing an RPO objective for the enterprise production system during off-peak production times.

18. The method of claim 5, comprising:
increasing an RPO objective for the enterprise production system during peak production times.

19. The method of claim 5, comprising:
establishing at least four timeframes for a weekly calendar schedule, wherein each of the at least four timeframes has a unique RPO objective and bandwidth limit.

20. The method of 6, comprising:
reducing an RPO objective for the enterprise production system during peak production times and increasing an RPO objective for the enterprise production system during off-peak production times to enable the enterprise production system to share bandwidth with the disaster recovery system.

* * * * *

UNITED STATES PATENT AND TRADEMARK OFFICE
CERTIFICATE OF CORRECTION

| | | |
|---|---|---|
| PATENT NO. | : 9,442,748 B2 | Page 1 of 1 |
| APPLICATION NO. | : 13/367448 | |
| DATED | : September 13, 2016 | |
| INVENTOR(S) | : Chen Burshan et al. | |

It is certified that error appears in the above-identified patent and that said Letters Patent is hereby corrected as shown below:

On the Title Page

In the Inventor section, amend Inventor information as follows:
(75) Inventors:  Chen Burshan, Tel Aviv, IL
                 Omri Shefi, Qiryat Ono, IL
                 Yair Kuszpet, Netanya, IL
                 Ziv Kedem, Tel Aviv, IL Signed and Sealed this
Twelfth Day of January, 2021

Andrei Iancu
*Director of the United States Patent and Trademark Office*